United States Patent
Takegami

(10) Patent No.: US 12,413,151 B2
(45) Date of Patent: Sep. 9, 2025

(54) POWER CONVERSION SYSTEM WITH INCREASED DETECTION ACCURACY

(71) Applicant: TDK CORPORATION, Tokyo (JP)

(72) Inventor: Eiji Takegami, Tokyo (JP)

(73) Assignee: TDK CORPORATION, Tokyo (JP)

( * ) Notice: Subject to any disclaimer, the term of this patent is extended or adjusted under 35 U.S.C. 154(b) by 279 days.

(21) Appl. No.: 18/308,926

(22) Filed: Apr. 28, 2023

(65) Prior Publication Data

US 2023/0387811 A1 Nov. 30, 2023

(30) Foreign Application Priority Data

May 24, 2022 (JP) ................................. 2022-084537

(51) Int. Cl.
*H02M 3/335* (2006.01)
*H02M 1/00* (2006.01)
*H02M 3/158* (2006.01)

(52) U.S. Cl.
CPC ..... *H02M 3/33523* (2013.01); *H02M 1/0009* (2021.05); *H02M 3/33515* (2013.01); *H02M 3/1584* (2013.01)

(58) Field of Classification Search
CPC ......... H02M 3/33523; H02M 3/33515; H02M 1/0009; H02M 3/1584; H02M 3/335
See application file for complete search history.

(56) References Cited

U.S. PATENT DOCUMENTS

| 10,454,374 B2 | 10/2019 | Takegami et al. | |
|---|---|---|---|
| 2003/0048648 A1* | 3/2003 | Lin | H02M 3/285 363/65 |
| 2019/0074692 A1* | 3/2019 | Yang | H02M 1/14 |
| 2019/0149048 A1* | 5/2019 | Takegami | H02M 3/157 323/282 |
| 2020/0382006 A1* | 12/2020 | Li | H02M 3/33515 |

FOREIGN PATENT DOCUMENTS

JP 2019-92244 A 6/2019

* cited by examiner

*Primary Examiner* — Alex Torres-Rivera
(74) *Attorney, Agent, or Firm* — Oliff PLC

(57) ABSTRACT

A power conversion apparatus includes an input power terminal, an output power terminal, a power conversion circuit, a signal generation circuit, and a control circuit. The power conversion circuit converts supplied electric power and outputs the converted electric power. The power conversion circuit includes a sensor that generates a first detection signal corresponding to an output voltage or an output current. The signal generation circuit generates a second detection signal corresponding to the first detection signal. The control circuit controls operation of the power conversion circuit. The signal generation circuit includes a corrector, a photocoupler, and an output circuit. The corrector performs correction processing on the first detection signal. The photocoupler includes a light receiving device generating a light reception signal. The output circuit outputs the second detection signal corresponding to the light reception signal. The corrector performs the correction processing corresponding to a current transfer ratio of the photocoupler.

8 Claims, 13 Drawing Sheets

POWER CONVERSION SYSTEM WITH INCREASED DETECTION ACCURACY

CROSS-REFERENCE TO RELATED APPLICATIONS

The present application claims priority from Japanese Patent Application No. 2022-084537 filed on May 24, 2022, the entire contents of which are hereby incorporated by reference.

BACKGROUND

The disclosure relates to a power conversion apparatus and a power conversion system that each convert electric power.

An exemplary power conversion apparatus detects an output voltage or an output current. For example, Japanese Unexamined Patent Application Publication No. 2019-092244 discloses a technique of controlling respective output currents of parallel-coupled power conversion apparatuses to be substantially equal to each other.

SUMMARY

A power conversion apparatus according to an embodiment of the disclosure includes an input power terminal, an output power terminal, a power conversion circuit, a signal generation circuit, and a control circuit. The power conversion circuit is configured to convert electric power supplied via the input power terminal and to output converted electric power via the output power terminal. The power conversion circuit includes a sensor configured to generate a first detection signal corresponding to an output voltage or an output current. The signal generation circuit is configured to generate a second detection signal corresponding to the first detection signal. The control circuit is configured control operation of the power conversion circuit. The signal generation circuit includes a corrector, a photocoupler, and an output circuit. The corrector is configured to perform correction processing on the first detection signal. The photocoupler includes a light emitting device and a light receiving device. The light emitting device is configured to emit light at a luminance corresponding to the first detection signal having undergone the correction processing. The light receiving device is configured to receive the light emitted by the light emitting device and to generate a light reception signal corresponding to the amount of the light received from the light emitting device. The output circuit is configured to output the second detection signal corresponding to the light reception signal. The corrector is configured to perform the correction processing corresponding to a current transfer ratio of the photocoupler.

A power conversion system according to an embodiment of the disclosure includes a plurality of power conversion apparatuses. Each of the power conversion apparatuses includes an input power terminal, an output power terminal, a power conversion circuit, a signal generation circuit, a signal terminal, and a control circuit. The power conversion circuit is configured to convert electric power supplied via the input power terminal and to output converted electric power via the output power terminal. The power conversion circuit includes a sensor configured to generate a first detection signal corresponding to an output voltage or an output current. The signal generation circuit is configured to generate a second detection signal corresponding to the first detection signal. The signal terminal is led to a terminal that allows for output of the second detection signal of the signal generation circuit. The control circuit is configured control operation of the power conversion circuit, based on a voltage at the signal terminal and a voltage of the second detection signal. The respective signal terminals of the power conversion apparatuses are coupled to each other. The signal generation circuit includes a corrector, a photocoupler, and an output circuit. The corrector is configured to perform correction processing on the first detection signal. The photocoupler includes a light emitting device and a light receiving device. The light emitting device is configured to emit light at a luminance corresponding to the first detection signal having undergone the correction processing. The light receiving device is configured to receive the light emitted by the light emitting device and to generate a light reception signal corresponding to the amount of the light received from the light emitting device. The output circuit is configured to output the second detection signal corresponding to the light reception signal. The corrector is configured to perform the correction processing corresponding to a current transfer ratio of the photocoupler.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
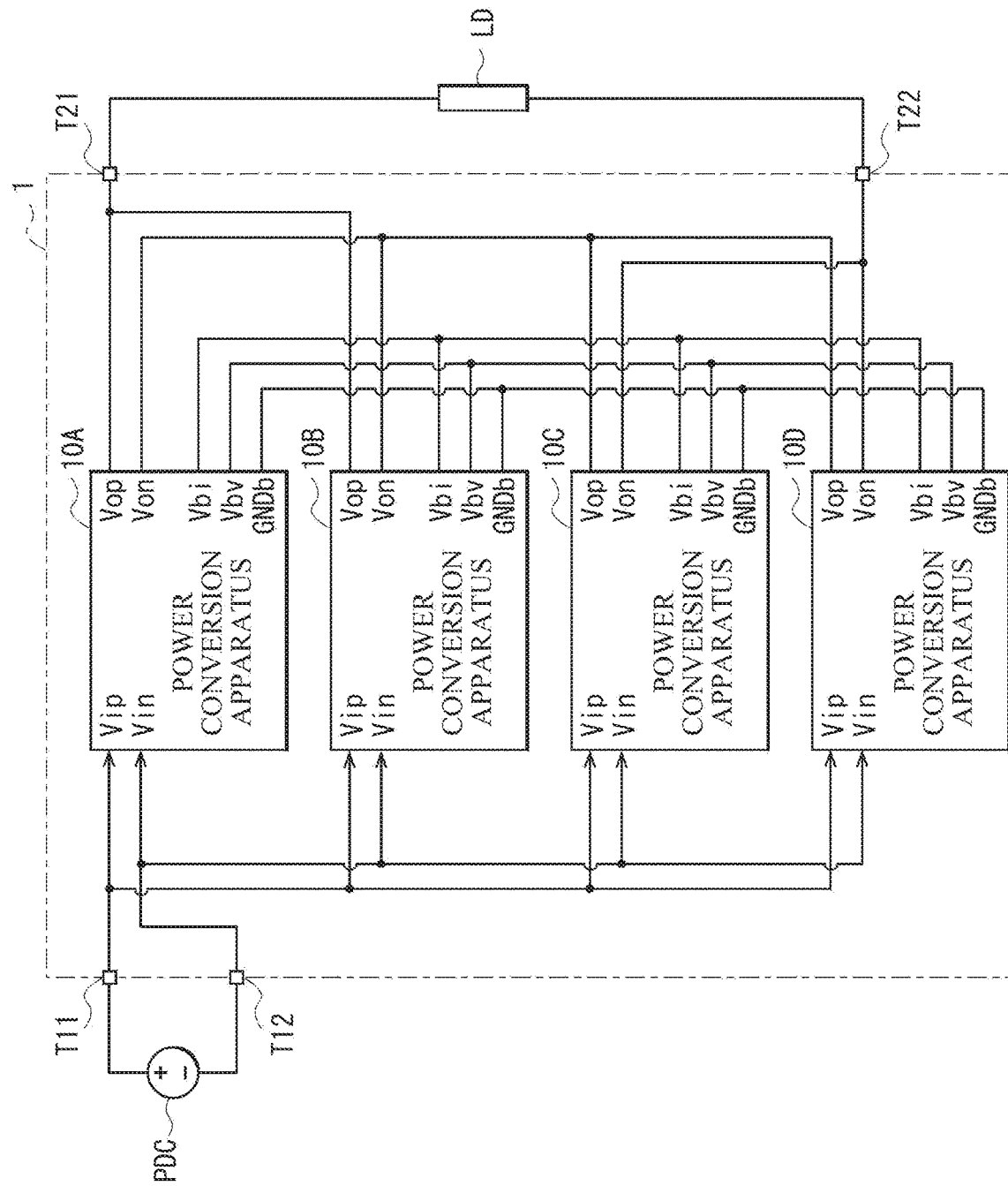
FIG. 1 is a block diagram illustrating a configuration example of a power conversion system according to one example embodiment of the disclosure.

It is desired that an output voltage and an output current be detected with high accuracy, and expectations are placed on a further improvement in detection accuracy.

It is desirable to provide a power conversion apparatus and a power conversion system that each make it possible to increase detection accuracy.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

EXAMPLE EMBODIMENT

Configuration Example

FIG. 1 illustrates a configuration example of a power conversion system 1 according to an example embodiment of the disclosure. The power conversion system 1 may be configured to convert a direct-current electric power supplied from a direct-current power supply PDC and to supply the converted direct-current electric power to a load LD.

The power conversion system 1 may include power terminals T11 and T12, a plurality of power conversion apparatuses 10, and power terminals T21 and T22. In the example embodiment, the power conversion system 1 may include four power conversion apparatuses 10A, 10B, 10C, and 10D, although it is not limited thereto.

The power terminals T11 and T12 may each allow for reception of electric power to the power conversion system 1. The power terminal T11 may be coupled to a first end of the direct-current power supply PDC, and the power terminal T12 may be coupled to a second end of the direct-current power supply PDC. For example, the direct-current power supply PDC may be a power supply circuit that generates direct-current electric power, or may be a battery.

The four power conversion apparatuses 10 may each be an isolated DC-to-DC conversion circuit, and may each include input power terminals Vip and Vin, output power terminals Vop and Von, balance terminals Vbi and Vbv, and a reference terminal GNDb.

The input power terminals Vip and Vin may each allow for reception of electric power to the power conversion apparatus 10. The respective input power terminals Vip of the power conversion apparatuses 10A to 10D may be coupled to each other, and may also be coupled to the power terminal T11. The respective input power terminals Vin of the power conversion apparatuses 10A to 10D may be coupled to each other, and may also be coupled to the power terminal T12.

The output power terminals Vop and Von may each allow for output of electric power converted by the power conversion apparatus 10. The respective output power terminals Vop of the power conversion apparatuses 10A and 10B may be coupled to each other, and may also be coupled to the power terminal T21. The respective output power terminals Von of the power conversion apparatuses 10A and 10B may be coupled to each other, and may also be coupled to the respective output power terminals Vop of the power conversion apparatuses 10C and 10D. The respective output power terminals Vop of the power conversion apparatuses 10C and 10D may be coupled to each other, and may also be coupled to the respective output power terminals Von of the power conversion apparatuses 10A and 10B. The respective output power terminals Von of the power conversion apparatuses 10C and 10D may be coupled to each other, and may also be coupled to the power terminal T22.

The balance terminal Vbi may allow for reception and output of a signal adapted to cause respective output currents, i.e., later-described output currents Tout, of the four power conversion apparatuses 10 to be equal to each other. The respective balance terminals Vbi of the power conversion apparatuses 10A to 10D are couped to each other.

The balance terminal Vbv may allow for reception and output of a signal adapted to cause respective output voltages, i.e., later-described output voltages Vout, of the four power conversion apparatuses 10 to be equal to each other. The respective balance terminals Vbv of the power conversion apparatuses 10A to 10D are couped to each other.

The reference terminal GNDb may allow for reception and output of a reference voltage of later-described tertiary-side circuitry of corresponding one of the four power conversion apparatuses 10. The respective reference terminals GNDb of the power conversion apparatuses 10A to 10D may be couped to each other.

The power terminals T21 and T22 may each allow for output of electric power converted by the power conversion system 1. The power terminal T21 may be coupled to a first end of the load LD, and the power terminal T22 may be coupled to a second end of the load LD.

Figure 2:
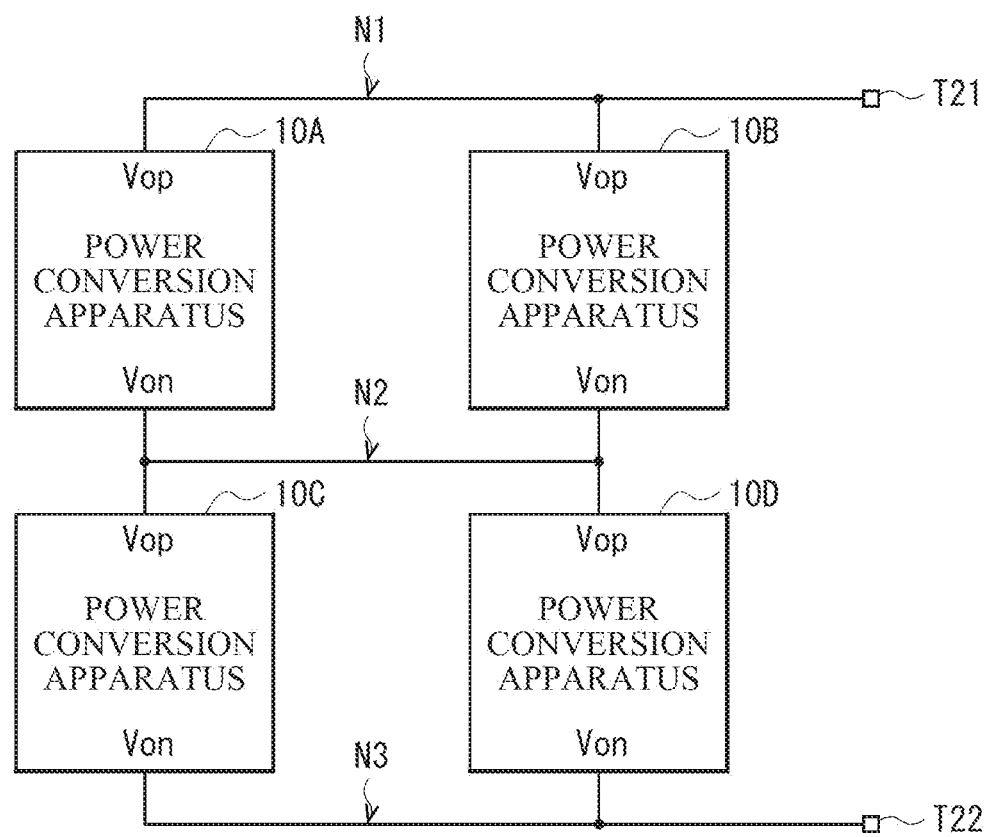
FIG. 2 is an explanatory diagram illustrating a coupling example of power conversion apparatuses illustrated in FIG. 1.

FIG. 2 illustrates coupling between the output power terminals Vop and Von of the four power conversion apparatuses 10. The respective output power terminals Vop of the power conversion apparatuses 10A and 10B may be coupled to a power node N1 led to the power terminal T21. The respective output power terminals Von of the power conversion apparatuses 10A and 10B may be coupled to a power node N2. The respective output power terminals Vop of the power conversion apparatuses 10C and 10D may be coupled to the power node N2. The respective output power terminals Von of the power conversion apparatuses 10C and 10D may be coupled to a power node N3 led to the power terminal T22. In the power conversion system 1, the power conversion apparatuses 10A and 10B may be coupled in parallel, and the power conversion apparatuses 10C and 10D may be coupled in parallel. Further, the power conversion apparatuses 10A and 10B and the power conversion apparatuses 10C and 10D may be coupled in series.

[Power Conversion Apparatus 10]

Figure 3:
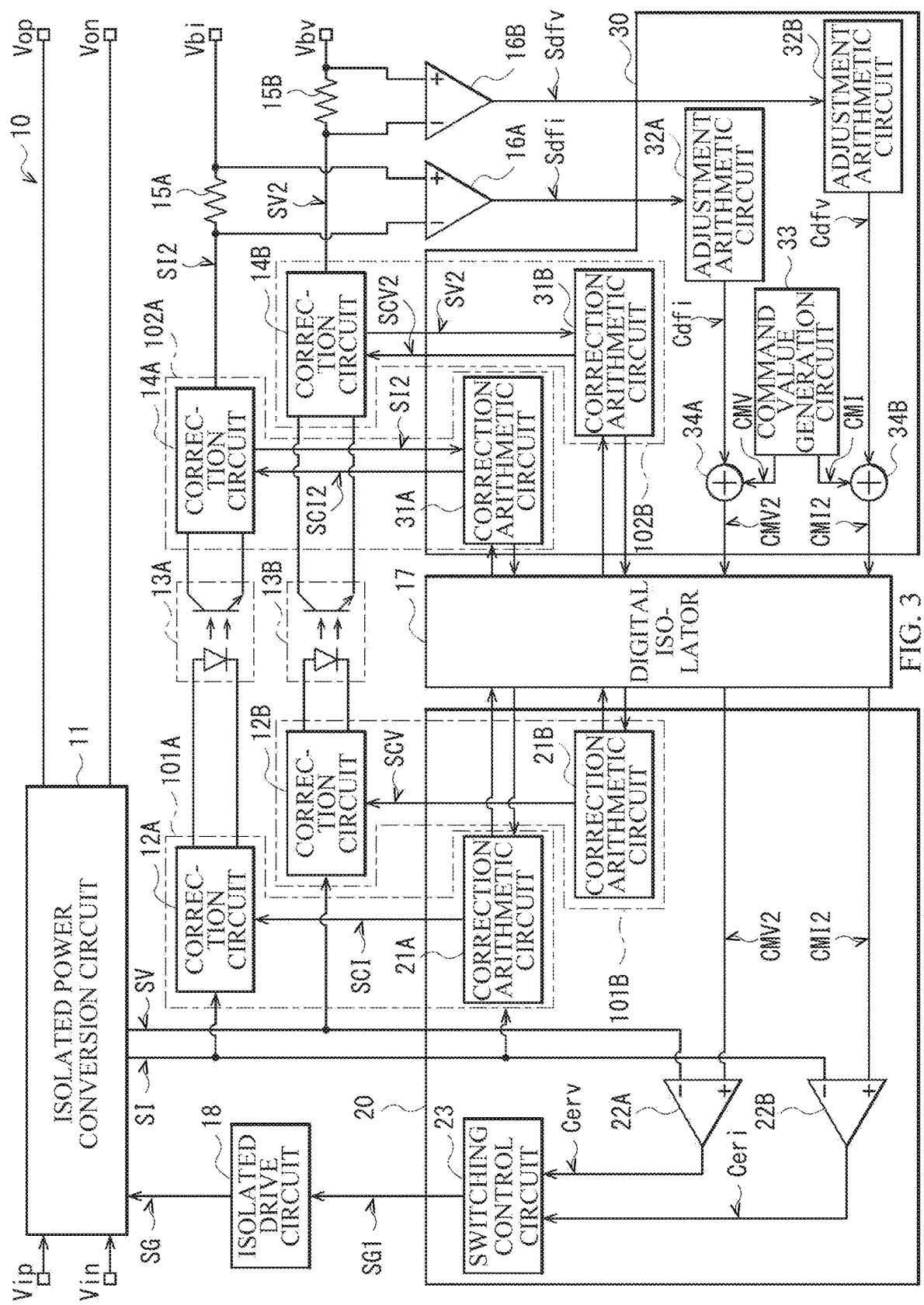
FIG. 3 is a block diagram illustrating a configuration example of each of the power conversion apparatuses illustrated in FIG. 1.

FIG. 3 illustrates a configuration example of the power conversion apparatus 10. The power conversion apparatus 10 may include an isolated power conversion circuit 11, correction circuits 12A and 12B, photocouplers 13A and 13B, correction circuits 14A and 14B, resistors 15A and 15B, amplifiers 16A and 16B, a microcontroller unit (an MCU) 30, a digital isolator 17, an MCU 20, and an isolated drive circuit 18.

The isolated power conversion circuit 11 is configured to convert direct-current electric power supplied via the input power terminals Vip and Vin and to output the converted direct-current electric power via the output power terminals Vop and Von.

Figure 4:
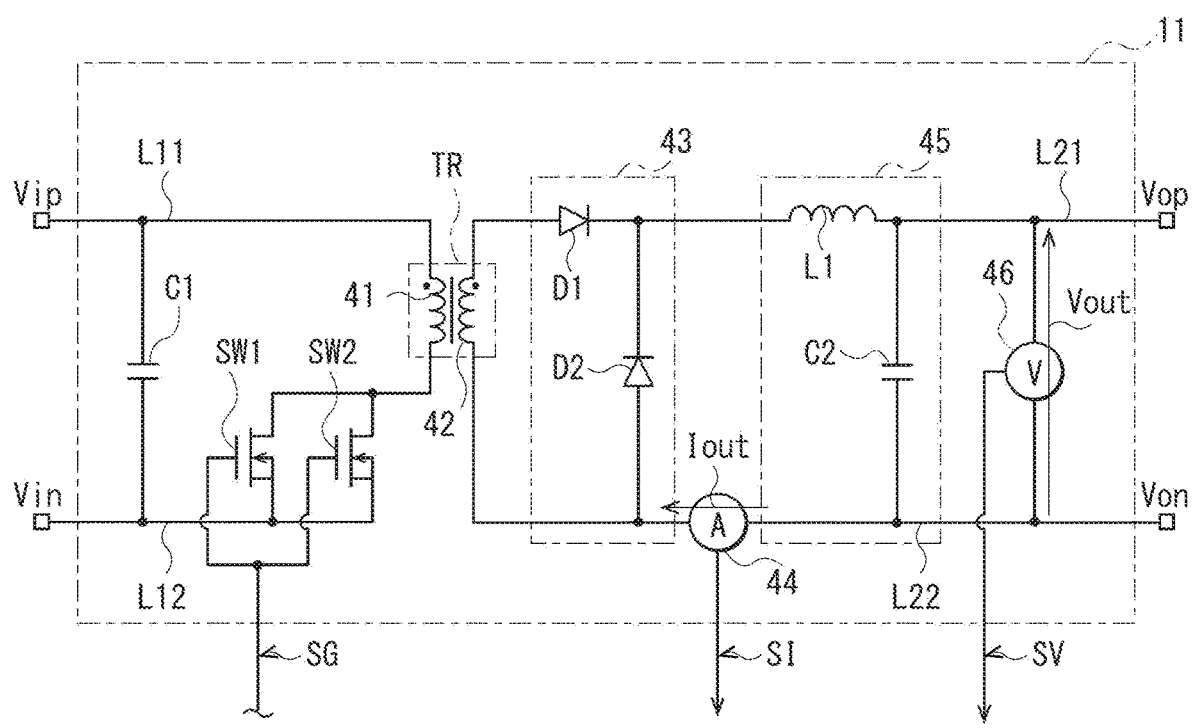
FIG. 4 is a circuit diagram illustrating a configuration example of an isolated power conversion circuit illustrated in FIG. 3.

FIG. 4 illustrates a configuration example of the isolated power conversion circuit 11. The isolated power conversion circuit 11 may include a capacitor C1, transistors SW1 and SW2, a transformer TR, a rectifier circuit 43, a current sensor 44, a smoothing circuit 45, and a voltage sensor 46. Primary-side circuitry of the isolated power conversion circuit 11 may include the capacitor C1 and the transistors SW1 and SW2. Secondary-side circuitry of the isolated power conversion circuit 11 may include the rectifier circuit 43, the current sensor 44, the smoothing circuit 45, and the voltage sensor 46.

The capacitor C1 may have a first coupled to a voltage line L11 led to the input power terminal Vip, and a second end coupled to a reference voltage line L12 led to the input power terminal Vin. In the example embodiment, the transistors SW1 and SW2 may be N-type field-effect transistors (FETs), although they are not limited thereto. The transistor SW1 may have a gate to be supplied with a gate signal SG, a drain coupled to a later-described primary winding 41 of the transformer TR, and a source coupled to the reference voltage line L12. The transistor SW2 may have a gate to be supplied with the gate signal SG, a drain coupled to the primary winding 41 of the transformer TR, and a source coupled to the reference voltage line L12.

The transformer TR may be configured to provide direct-current isolation and alternating-current coupling between the primary-side circuitry and the secondary-side circuitry. The transformer TR may include the primary winding 41 and a secondary winding 42. The primary winding 41 may have a first end coupled to the voltage line L11, and a second end coupled to the drains of the transistors SW1 and SW2. The secondary winding 42 may have a first end coupled to a voltage line L21 led to the output power terminal Vop, and a second end coupled to a reference voltage line L22 led to the output power terminal Von.

The rectifier circuit 43 may be configured to rectify an alternating-current voltage outputted from the secondary winding 42 of the transformer TR. The rectifier circuit 43 may include diodes D1 and D2. The diode D1 may be provided on the voltage line L21. The diode D1 may have an anode coupled to the first end of the secondary winding 42, and a cathode coupled to a cathode of the diode D2 and to the smoothing circuit 45. The diode D2 may have an anode coupled to the reference voltage line L22, and the cathode coupled to the cathode of the diode D1 on the reference voltage line L21.

The current sensor 44 may be configured to detect the output current Tout of the power conversion apparatus 10. The current sensor 44 may be provided on the reference voltage line L22. The current sensor 44 may have a first end coupled to the second end of the secondary winding 42 and to the anode of the diode D2, and a second end coupled to the smoothing circuit 45. On the reference voltage line L22, the current sensor 44 may detect a current flowing from the smoothing circuit 45 toward the rectifier circuit 43 as the output current Tout. The output current Tout may have a positive polarity when the current is directed from the smoothing circuit 45 toward the rectifier circuit 43. In addition, the current sensor 44 may be configured to generate a detection signal SI having a voltage corresponding to the output current Tout. The current sensor 44 may include, for example, a resistor provided on the reference voltage line L22 and an amplifier circuit amplifying a voltage difference across the resistor. In such a case, the current sensor 44 may generate the detection signal SI by amplifying the voltage difference across the resistor. Note that although the current sensor 44 may be provided on the reference voltage line L22 in the example embodiment, this is non-limiting. In some embodiments, the current sensor 44 may be provided on the voltage line L21.

The smoothing circuit 45 may be configured to smooth the voltage rectified by the rectifier circuit 43. The smoothing circuit 45 may include an inductor L1 and a capacitor C2. The inductor L1 may be provided on the voltage line L21. The inductor L1 may have a first end coupled to the cathodes of the diodes D1 and D2, and a second end coupled to the capacitor C2. The capacitor C2 may have a first end coupled to the second end of the inductor L1 on the voltage line L21, and a second end coupled to the second end of the current sensor 44 on the reference voltage line L22.

The voltage sensor 46 may be configured to detect the output voltage Vout of the power conversion apparatus 10. The voltage sensor 46 may have a first end coupled to the second end of the inductor L1 on the voltage line L21, and a second end coupled to the second end of the current sensor 44 on the reference voltage line L22. The voltage sensor 46 may detect, as the output voltage Vout, a voltage, at the voltage line L21, which is based on a voltage at the reference voltage line L22. In addition, the voltage sensor 46 may be configured to generate a detection signal SV having a voltage value corresponding to a voltage value of the above-described voltage. The voltage sensor 46 may include, for example, a resistor network including multiple resistors coupled in series to each other. In such a case, the voltage sensor 46 may generate the detection signal SV by dividing the output voltage Vout using the multiple resistors.

As illustrated in FIG. 1, the four power conversion apparatuses 10A to 10D may be supplied with direct-current electric power from the direct-current power supply PDC. Accordingly, respective operating voltages of primary-side circuitry of the power conversion apparatuses 10A to 10D may be equal to each other.

As illustrated in FIG. 2, the power conversion apparatuses 10A and 10B and the power conversion apparatuses 10C and 10D may be coupled in series. Accordingly, respective operating voltages, based on a voltage at the power terminal T22, of secondary-side circuitry of the power conversion apparatuses 10A and 10B may be higher than respective operating voltages, based on the voltage at the power terminal T22, of the secondary-side circuitry of the power conversion apparatuses 10C and 10D.

In FIG. 3, the correction circuits 12A and 12B and the MCU 20 may configure the secondary-side circuitry, together with the rectifier circuit 43, the current sensor 44, the smoothing circuit 45, and the voltage sensor 46 illustrated in FIG. 4. The correction circuits 14A and 14B, the resistors 15A and 15B, the amplifiers 16A and 16B, and the MCU 30 may configure the tertiary-side circuitry.

As illustrated in FIG. 1, the reference terminals GNDb of the four power conversion apparatuses 10 may be coupled to each other. Accordingly, reference voltages of the tertiary-side circuitry of the four power conversion apparatuses 10 may be the same, and respective operating voltages of the tertiary-side circuitry of the four power conversion apparatuses 10 may be equal to each other accordingly.

As illustrated in FIG. 3, the MCU 20 may include correction arithmetic circuits 21A and 21B, error amplifiers 22A and 22B, and a switching control circuit 23. The MCU 30 may include correction arithmetic circuits 31A and 31B, adjustment arithmetic circuits 32A and 32B, a command value generation circuit 33, and adder circuits 34A and 34B. The MCUs 20 and 30 may each include an analog-to-digital conversion circuit that converts a supplied analog signal into a digital value. The MCUs 20 and 20 may each perform processing, based on the digital value resulting from the conversion.

The correction circuit 12A, and the correction arithmetic circuit 21A of the MCU 20 may configure a corrector 101A.

The correction circuit 12A may be configured to correct the detection signal SI supplied from the current sensor 44. The correction circuit 12A may subject the detection signal SI to correction corresponding to a characteristic of the photocoupler 13A, based on a correction signal SCI supplied from the correction arithmetic circuit 21A. Based on the detection signal SI having undergone the correction, the correction circuit 12A may drive a light emitting device of the photocoupler 13A.

The correction arithmetic circuit 21A may be configured to recognize the characteristic of the photocoupler 13A by transmitting and receiving data to and from the correction arithmetic circuit 31A via the digital isolator 17, and to generate the correction signal SCI corresponding to the characteristic of the photocoupler 13A. Further, the correction arithmetic circuit 21A may supply the correction circuit 12A with the correction signal SCI generated.

The photocoupler 13A may be configured to transmit and receive signals while electrically isolating the signals. The photocoupler 13A includes the light emitting device and a light receiving device. The light emitting device may be coupled to the correction circuit 12A, and the light receiving device may be coupled to the correction circuit 14A. The light emitting device emits light at a luminance corresponding to a signal supplied from the correction circuit 12A. The light receiving device receives the light emitted by the light emitting device. The light receiving device may supply the correction circuit 14A with a light reception signal corresponding to the amount of the light received from the light emitting device.

The correction circuit 14A, and the correction arithmetic circuit 31A of the MCU 30 may configure an output circuit 102A.

The correction circuit 14A may be configured to generate a detection signal SI2 corresponding to the light reception signal supplied from the photocoupler 13A, and to correct the detection signal SI2, based on a correction signal SCI2 supplied from the correction arithmetic circuit 31A. The correction circuit 14A may perform correction corresponding to the characteristic of the photocoupler 13A.

The correction arithmetic circuit 31A may be configured to estimate the characteristic of the photocoupler 13A by transmitting and receiving data to and from the correction arithmetic circuit 21A via the digital isolator 17, and to generate the correction signal SCI2 corresponding to the characteristic of the photocoupler 13A. Further, the correction arithmetic circuit 31A may supply the correction circuit 14A with the correction signal SCI2 generated.

Such a configuration makes it possible for the power conversion apparatus 10 to generate, based on the detection signal SI supplied from the current sensor 44, the detection signal SI2 corresponding to the detection signal SI, while reducing an influence of the characteristic of the photocoupler 13A. For example, the photocoupler 13A can vary in current transfer ratio (CTR) depending on an environmental condition, such as temperature. The current transfer ratio is a ratio of a light reception current flowing through the light receiving device of the photocoupler 13A to a light emission current flowing through the light emitting device of the photocoupler 13A. The current transfer ratio can also decrease, for example, with time. Because the current transfer ratio of the photocoupler 13A can thus vary, the detection signal SI2 can vary even if the detection signal SI is the same. In the power conversion apparatus 10, the detection signal SI2 may be generated by performing correction corresponding to the characteristic of the photocoupler 13A. This makes it possible for the power conversion apparatus 10 to reduce the influence of the characteristic of the photocoupler 13A on the detection signal SI2.

The correction circuit 12B, and the correction arithmetic circuit 21B of the MCU 20 may configure a corrector 101B.

As with the correction circuit 12A, the correction circuit 12B may be configured to correct the detection signal SV supplied from the voltage sensor 46. The correction circuit 12B may subject the detection signal SV to correction corresponding to a characteristic of the photocoupler 13B, based on a correction signal SCV supplied from the correction arithmetic circuit 21B. Based on the detection signal SV having undergone the correction, the correction circuit 12B may drive a light emitting device of the photocoupler 13B.

As with the correction arithmetic circuit 21A, the correction arithmetic circuit 21B may be configured to recognize the characteristic of the photocoupler 13B by transmitting and receiving data to and from the correction arithmetic circuit 31B via the digital isolator 17, and to generate the correction signal SCV corresponding to the characteristic of the photocoupler 13B. Further, the correction arithmetic circuit 21B may supply the correction circuit 12B with the correction signal SCV generated.

As with the photocoupler 13A, the photocoupler 13B may be configured to transmit and receive signals while electrically isolating the signals. The photocoupler 13B includes the light emitting device and a light receiving device. The light emitting device may be coupled to the correction circuit 12B, and the light receiving device may be coupled to the correction circuit 14B.

The correction circuit 14B, and the correction arithmetic circuit 31B of the MCU 30 may configure an output circuit 102B.

As with the correction circuit 14A, the correction circuit 14B may be configured to generate a detection signal SV2 corresponding to a light reception signal supplied from the photocoupler 13B, and to correct the detection signal SV2, based on a correction signal SCV2 supplied from the correction arithmetic circuit 31B. The correction circuit 14B may perform correction corresponding to the characteristic of the photocoupler 13B.

As with the correction arithmetic circuit 31A, the correction arithmetic circuit 31B may be configured to estimate the characteristic of the photocoupler 13B by transmitting and receiving data to and from the correction arithmetic circuit 21B via the digital isolator 17, and to generate the correction signal SCV2 corresponding to the characteristic of the photocoupler 13B. Further, the correction arithmetic circuit 31B may supply the correction circuit 14B with the correction signal SCV2 generated.

Such a configuration makes it possible for the power conversion apparatus 10 to generate, based on the detection signal SV supplied from the voltage sensor 46, as with the detection signal SI, the detection signal SV2 corresponding to the detection signal SV, while reducing an influence of the characteristic of the photocoupler 13B.

The resistor 15A may have a first end coupled to an output terminal of the correction circuit 14A and to a negative input terminal of the amplifier 16A, and a second end coupled to a positive input terminal of the amplifier 16A and to the balance terminal Vbi. As illustrated in FIG. 1, the respective balance terminals Vbi of the four power conversion apparatuses 10 are coupled to each other. This causes a voltage at the balance terminal Vbi to be an average voltage of the detection signals SI2 of the four power conversion apparatuses 10.

The positive input terminal of the amplifier 16A may be coupled to the second end of the resistor 15A and to the balance terminal Vbi. The negative input terminal of the amplifier 16A may be coupled to the first end of the resistor 15A and to the output terminal of the correction circuit 14A. The amplifier 16A may amplify a voltage difference across the resistor 15A to thereby generate a difference signal Sdfi.

The resistor 15B may have a first end coupled to an output terminal of the correction circuit 14B and to a negative input terminal of the amplifier 16B, and a second end coupled to a positive input terminal of the amplifier 16B and to the balance terminal Vbv. As illustrated in FIG. 1, the respective balance terminals Vbv of the four power conversion apparatuses 10 are coupled to each other. This causes a voltage at the balance terminal Vbv to be an average voltage of the detection signals SV2 of the four power conversion apparatuses 10.

The positive input terminal of the amplifier 16B may be coupled to the second end of the resistor 15B and to the valance terminal Vbv. The negative input terminal of the amplifier 16B may be coupled to the first end of the resistor 15B and to the output terminal of the correction circuit 14B. The amplifier 16B may amplify a voltage difference across the resistor 15B to thereby generate a difference signal Sdfv.

The adjustment arithmetic circuit 32A may be configured to generate a difference value Cdfi by performing predetermined adjustment arithmetic processing, based on a digital value of the difference signal Sdfi. The difference value Cdfi may vary depending on the difference signal Sdfi. The adjustment arithmetic circuit 32B may be configured to generate a difference value Cdfv by performing predetermined adjustment arithmetic processing, based on a digital value of the difference signal Sdfv. The difference value Cdfv may vary depending on the difference signal Sdfv.

The command value generation circuit 33 may be configured to generate a voltage command value CMV of the output voltage Vout of the power conversion apparatus 10 and a current command value CMI of the output current Tout of the power conversion apparatus 10.

The adder circuit 34A may be configured to generate a voltage command value CMV2 by adding up the difference value Cdfi and the voltage command value CMV. The adder circuit 34B may be configured to generate a current command value CMI2 by adding up the difference value Cdfv and the current command value CMI.

The digital isolator 17 may be configured to supply a digital signal from the MCU 20 to the MCU 30 and to supply a digital signal from the MCU 30 to the MCU 20. The digital isolator 17 may transmit and receive the digital signals to and from the MCU 20 and the MCU 30 while electrically isolating the MCU 20 and the MCU 30 from each other.

The error amplifier 22A may have a positive input terminal and a negative input terminal. The positive input terminal may receive the voltage command value CMV2 supplied from the MCU 30 via the digital isolator 17. The negative input terminal may receive a digital value of the detection signal SV supplied from the voltage sensor 46. The digital value of the detection signal SV may correspond to a digital value of the output voltage Vout of the power conversion apparatus 10. The error amplifier 22A may generate an error value Cerv by amplifying a difference between the voltage command value CMV2 and the digital value of the detection signal SV.

The error amplifier 22B may have a positive input terminal and a negative input terminal. The positive input terminal may receive the current command value CMI2 supplied from the MCU 30 via the digital isolator 17. The negative input terminal may receive a digital value of the detection signal SI supplied from the current sensor 44. The digital value of the detection signal SI may correspond to a digital value of the output current Iout of the power conversion apparatus 10. The error amplifier 22B may generate an error value Ceri by amplifying a difference between the current command value CMI2 and the digital value of the detection signal SI.

The switching control circuit 23 may be configured to generate a gate signal SG1, based on the error values Cerv and Ceri, and to control, based on the gate signal SG1, operation of the isolated power conversion circuit 11.

The isolated drive circuit 18 may be configured to generate the gate signal SG, based on the gate signal SG1, and to drive, based on the gate signal SG, the transistors SW1 and SW2 of the isolated power conversion circuit 11 illustrated in FIG. 4. The MCU 20 generating the gate signal SG1 may be an element of the secondary-side circuitry, and the transistors SW1 and SW2 to be supplied with the gate signal SG may be elements of the primary-side circuitry. The isolated drive circuit 18 may thus drive the transistors SW1 and SW2, based on the gate signal SG1, while electrically isolating the MCU 20 and the transistors SW1 and SW2 from each other.

With such a configuration, in the power conversion apparatus 10, negative feedback control may be performed to cause the output voltage Vout detected by the voltage sensor 46 illustrated in FIG. 4 to be equal to a voltage indicated by the voltage command value CMV2, and negative feedback control may be performed to cause the output current Iout detected by the current sensor 44 to be equal to a current indicated by the current command value CMI2. The negative feedback control may be proportional (P) control or proportional and integral (PI) control.

In the power conversion system 1, it is possible to maintain balance between the respective output currents Iout of the power conversion apparatuses 10A to 10D. For example, suppose that the output current Iout of the power conversion apparatus 10A is more than the respective output currents Iout of the power conversion apparatuses 10B to 10D. In such a case, in the power conversion apparatus 10A, a voltage of the detection signal SI2 is higher than the voltage at the balance terminal Vbi, which makes the difference signal Sdfi smaller, makes the difference value Cdfi smaller, and makes the voltage command value CMV2 smaller. The output voltage Vout of the power conversion apparatus 10A is thereby controlled to be lower, and accordingly, the output current Tout of the power conversion apparatus 10A is made smaller. In contrast to the above, suppose that the output current Tout of the power conversion apparatus 10A is less than the respective output currents Tout of the power conversion apparatuses 10B to 10D. In such a case, in the power conversion apparatus 10A, the voltage of the detection signal SI2 is lower than the voltage at the balance terminal Vbi, which makes the difference signal Sdfi larger, makes the difference value Cdfi larger, and makes the voltage command value CMV2 larger. The output voltage Vout of the power conversion apparatus 10A is thereby controlled to be higher, and accordingly, the output current Tout of the power conversion apparatus 10A is made larger. The same holds true for the power conversion apparatuses 10B to 10D. In this way, in the power conversion system 1, the respective output currents Tout of the power conversion apparatus 10A to 10D are controllable to be substantially equal to each other.

Further, in the power conversion system 1, it is possible to maintain balance between the respective output voltages Vout of the power conversion apparatuses 10A to 10D. For example, suppose that the output voltage Vout of the power conversion apparatus 10A is higher than the respective output voltages Vout of the power conversion apparatuses 10B to 10D. In such a case, in the power conversion apparatus 10A, a voltage of the detection signal SV2 is higher than the voltage at the balance terminal Vbv, which makes the difference signal Sdfv smaller, makes the difference value Cdfv smaller, and makes the current command value CMI2 smaller. The output current Tout of the power conversion apparatus 10A is thereby controlled to be smaller, and accordingly, the output voltage Vout of the power conversion apparatus 10A is made lower. In contrast to the above, suppose that the output voltage Vout of the power conversion apparatus 10A is lower than the respective output voltages Vout of the power conversion apparatuses 10B to 10D. In such a case, in the power conversion apparatus 10A, the voltage of the detection signal SV2 is lower than the voltage at the balance terminal Vbv, which makes the difference signal Sdfv larger, makes the difference value Cdfv larger, and makes the current command value CMI2 larger. The output current Tout of the power conversion apparatus 10A is thereby controlled to be larger, and accordingly, the output voltage Vout of the power conversion apparatus 10A is made higher. The same holds true for the power conversion apparatuses 10B to 10D. In this way, in the power conversion system 1, the respective output voltages Vout of the power conversion apparatus 10A to 10D are controllable to be substantially equal to each other.

Figure 5:
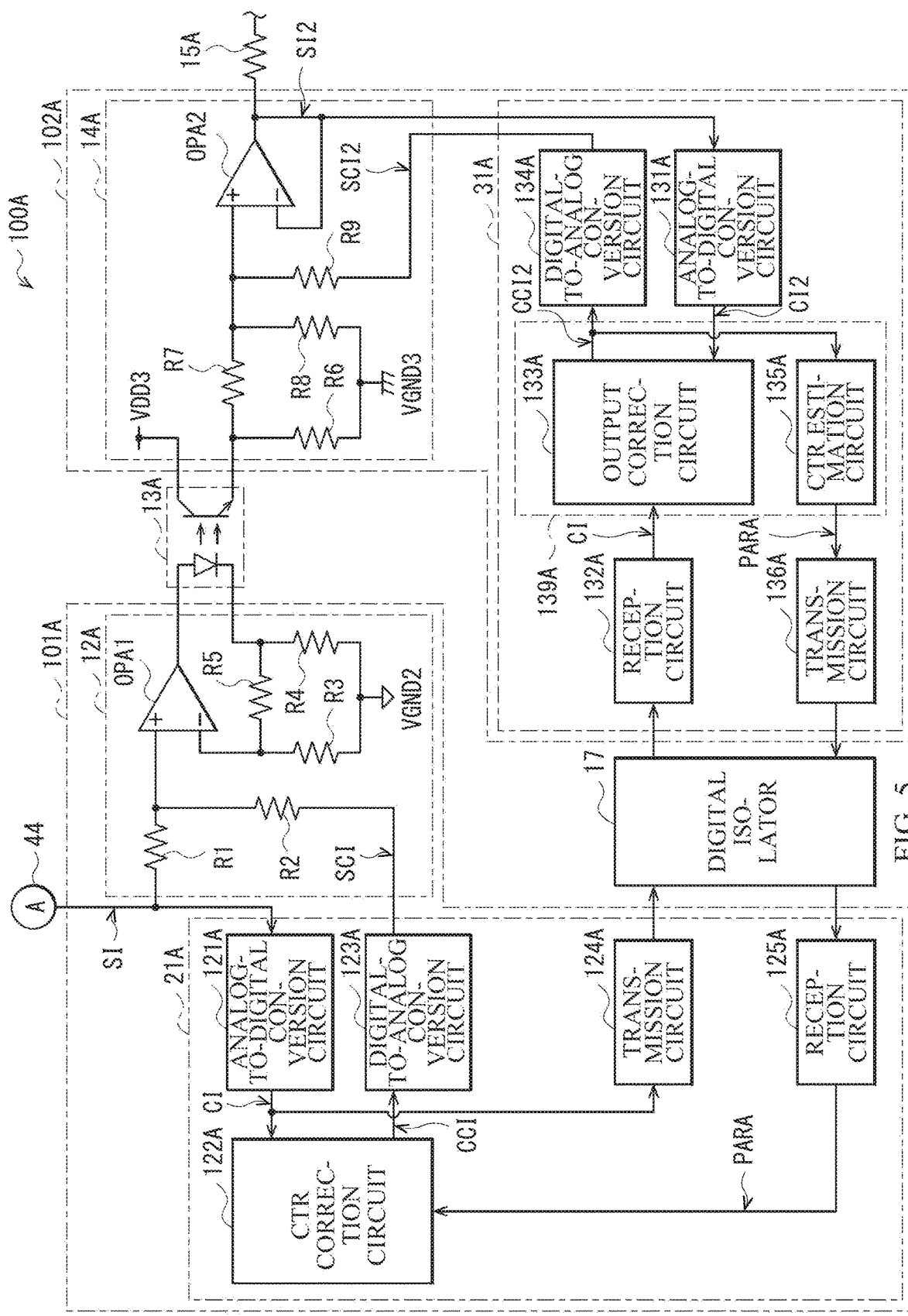
FIG. 5 is a circuit diagram illustrating a configuration example of a corrector and an output circuit illustrated in FIG. 3.

FIG. 5 illustrates a more specific but non-limiting configuration example of the corrector 101A and the output circuit 102A. The corrector 101A, the photocoupler 13A, and the output circuit 102A may configure a signal generation circuit 100A. Based on the detection signal SI in the secondary-side circuitry supplied from the current sensor 44, the signal generation circuit 100A may generate the detection signal SI2 in the tertiary-side circuitry corresponding to the detection signal SI, while reducing the influence of the characteristic of the photocoupler 13A.

[Corrector 101A]

The correction arithmetic circuit 21A of the corrector 101A may include an analog-to-digital conversion circuit 121A, a CTR correction circuit 122A, a digital-to-analog conversion circuit 123A, a transmission circuit 124A, and a reception circuit 125A.

The analog-to-digital conversion circuit 121A may be configured to generate a detection value CI which is the digital value of the detection signal SI, by performing, based on the detection signal SI supplied from the current sensor 44, analog-to-digital conversion at a predetermined sampling frequency.

The CTR correction circuit 122A may be configured to generate a correction value CCI, based on the detection value CI and a parameter PARA supplied from the reception circuit 125A. The parameter PARA indicates an estimated value of the current transfer ratio of the photocoupler 13A. For example, the CTR correction circuit 122A may generate, based on the parameter PARA, a correction function to which the detection value CI is to be inputted to output the correction value CCI, and generate the correction value CCI, based on the detection value CI and the correction function. In some embodiments, the CTR correction circuit 122A may generate, based on the parameter PARA, a lookup table to which the detection value CI is to be inputted to output the correction value CCI, and generate the correction value CCI, based on the detection value CI and the lookup table. The correction value CCI may be, for example, proportional to the detection value CI and vary depending on the detection value CI. For example, the CTR correction circuit 122A may make the correction value CCI large when the estimated value of the current transfer ratio is small, and may make the correction value CCI small when the estimated value of the current transfer ratio is large.

The digital-to-analog conversion circuit 123A may be configured to generate the correction signal SCI by performing, based on the correction value CCI generated by the CTR correction circuit 122A, digital-to-analog conversion at a predetermined sampling frequency. Further, the digital-to-analog conversion circuit 123A may supply the correction circuit 12A with the correction signal SCI generated.

The transmission circuit 124A may be configured to transmit the detection value CI generated by the analog-to-digital conversion circuit 121A to the correction arithmetic circuit 31A via the digital isolator 17.

The reception circuit 125A may be configured to receive the parameter PARA transmitted from the correction arithmetic circuit 31A via the digital isolator 17, and to supply the CTR correction circuit 122A with the parameter PARA received.

The correction circuit 12A of the corrector 101A may include resistors R1 and R2, operational amplifier OPA1, and resistors R3 to R5. The resistor R1 may have a first end to be supplied with the detection signal SI, and a second end coupled to the resistor R2 and to a positive input terminal of the operational amplifier OPA1. The resistor R2 may have a first end to be supplied with the correction signal SCI, and a second end coupled to the second end of the resistor R1 and to the positive input terminal of the operational amplifier OPAL The operational amplifier OPA1 may have the positive input terminal coupled to the second ends of the resistors R1 and R2, a negative input terminal coupled to the resistors R3 and R5, and an output terminal coupled to an anode of the light emitting device of the photocoupler 13A. In some embodiments, the light emitting device may be a light emitting diode. The resistor R3 may have a first end coupled to the negative input terminal of the operational amplifier OPA1 and to the resistor R5, and a second end coupled to a reference power supply node of a power supply voltage VGND2. This reference power supply node may be a node of a reference power supply of the secondary-side circuitry. The resistor R4 may have a first end coupled to a cathode of the light emitting device of the photocoupler 13A and to the resistor R5, and a second end coupled to the reference power supply node of the power supply voltage VGND2. The resistor R5 may have a first end coupled to the negative input terminal of the operational amplifier OPA1 and to the first end of the resistor R3, and a second end coupled to the cathode of the light emitting device of the photocoupler 13A and to the first end of the resistor R4.

In the correction circuit 12A, the detection signal SI and the correction signal SCI may be composited by the resistors R1 and R2 to thereby correct the detection signal SI, and the detection signal SI corrected may be supplied to the positive input terminal of the operational amplifier OPA1. Further, the correction circuit 12A may feed a current corresponding to a voltage at the positive input terminal of the operational amplifier OPA1 through the light emitting device of the photocoupler 13A.

For example, when the current transfer ratio of the photocoupler 13A is low, the light reception current at the light receiving device of the photocoupler 13A can become small. Accordingly, the correction arithmetic circuit 21A may make the correction signal SCI large to thereby make the voltage at the positive input terminal of the operational amplifier OPA1 high. This makes it possible to prevent the light reception current at the light receiving device of the photocoupler 13A from becoming small. Further, when the current transfer ratio of the photocoupler 13A is high, the light reception current at the light receiving device of the photocoupler 13A can become large. Accordingly, the correction arithmetic circuit 21A may make the correction signal SCI small to thereby make the voltage at the positive input terminal of the operational amplifier OPA1 low. This makes it possible to prevent the light reception current at the light receiving device of the photocoupler 13A from becoming large. In such a manner, the corrector 101A may correct the detection value SI to cause the light reception current at the light receiving device of the photocoupler 13A to be less susceptible to the current transfer ratio of the photocoupler 13A.

[Output Circuit 102A]

The correction circuit 14A of the output circuit 102A may include resistors R6 to R9 and an operational amplifier OPA2. The correction circuit 14A may couple a collector of the light receiving device of the photocoupler 13A to a power supply node of a power supply voltage VDD3. In some embodiments, the light receiving device may be a phototransistor. The resistor R6 may have a first end coupled to an emitter of the light receiving device of the photocoupler 13A and to the resistor R7, and a second end be coupled to a reference power supply node of a power supply voltage VGND3. This reference power supply node may be a node of a reference power supply of the tertiary-side circuitry, and may be coupled to the reference terminal GNDb illustrated in FIG. 1. The resistor R7 may have a first end coupled to the emitter of the light receiving device of the photocoupler 13A and to the first end of the resistor R6, and a second end coupled to the resistors R8 and R9 and to a positive input terminal of the operational amplifier OPA2. The resistor R8 may have a first end coupled to the second end of the resistor R7, to the resistor R9, and to the positive input terminal of the operation amplifier OPA2. The resistor R8 may have a second end coupled to the reference power supply node of the power supply voltage VGND3. The resistor R9 may have a first end to be supplied with the correction signal SCI2, and a second end coupled to the second end of the resistor R7, to the first end of the resistor R8, and to the positive input terminal of the operational amplifier OPA2. The positive input terminal of the operational amplifier OPA2 may be coupled to the second ends of the resistors R7 and R9 and to the first end of the resistor R8. A negative input terminal of the operational amplifier OPA2 may be coupled to an output terminal of the operational amplifier OPA2. The output terminal of operational amplifier OPA2 may be coupled to the negative input terminal of the operational amplifier OPA2. The operational amplifier OPA2 may configure a so-called voltage follower circuit, and may generate the detection signal SI2. The correction circuit 14A may supply the detection signal SI2 to the resistor 15A.

The correction arithmetic circuit 31A of the output circuit 102A may include an analog-to-digital conversion circuit 131A, a reception circuit 132A, an output correction circuit 133A, a digital-to-analog conversion circuit 134A, a CTR estimation circuit 135A, and a transmission circuit 136A. The output correction circuit 133A and the CTR estimation circuit 135A may configure a processing circuit 139A.

The analog-to-digital conversion circuit 131A may be configured to generate a detection value CI2 which is a digital value of the detection signal SI2, by performing, based on the detection signal SI2, analog-to-digital conversion at a predetermined sampling frequency.

The reception circuit 132A may be configured to receive the detection value CI transmitted from the correction arithmetic circuit 21A via the digital isolator 17, and to supply the output correction circuit 133A with the detection value CI received.

The output correction circuit 133A may be configured to calculate an expected value of the detection value CI2, based on the detection value CI supplied from the reception circuit 132A, and to generate a correction value CCI2 to cause the detection value CI2 supplied from the analog-to-digital conversion circuit 131A to be equal to the expected value. For example, it is desirable that the detection value CI2 be equal to the expected value obtained based on the detection value CI. However, the detection value CI2 can deviate from the expected value even when the corrector 101A has performed correction processing. To address this, the output correction circuit 133A may generate the correction value CCI2 to cause the detection value CI2 to be equal to the expected value.

The digital-to-analog conversion circuit 134A may be configured to generate the correction signal SCI2 by performing, based on the correction value CCI2 generated by the output correction circuit 133A, digital-to-analog conversion at a predetermined sampling frequency. Further, the digital-to-analog conversion circuit 134A may supply the correction circuit 14A with the correction signal SCI2 generated.

The CTR estimation circuit 135A may be configured to estimate the current transfer ratio of the photocoupler 13A, based on the correction value CCI2 generated by the output correction circuit 133A. Further, the CTR estimation circuit 135A may supply the parameter PARA indicating the estimated value of the current transfer ratio to the transmission circuit 136A. Note that although the CTR estimation circuit 135A may estimate the current transfer ratio based on the correction value CCI2 in the example embodiment, this is non-limiting. In some embodiments, the CTR estimation circuit 135A may estimate the current transfer ratio, based on processed data inside the output correction circuit 133A. In some embodiments, the CTR estimation circuit 135A may estimate the current transfer ratio, based on detection value CI and the detection value CI2.

The transmission circuit 136A may be configured to transmit the parameter PARA generated by the CTR estimation circuit 135A to the correction arithmetic circuit 21A via the digital isolator 17.

In the correction circuit 14A, the light reception signal of the light receiving device of the photocoupler 13A and the correction signal SCI2 may be composited by the resistors R7 to R9. The output correction circuit 133A may generate the correction value CCI2 to cause the detection value CI2 to be equal to the expected value of the detection value CI2.

Accordingly, the output circuit 102A may correct the detection signal SI2 to cause the detection signal SI2 to become an expected detection signal SI2 corresponding to the detection signal SI.

Figure 6:
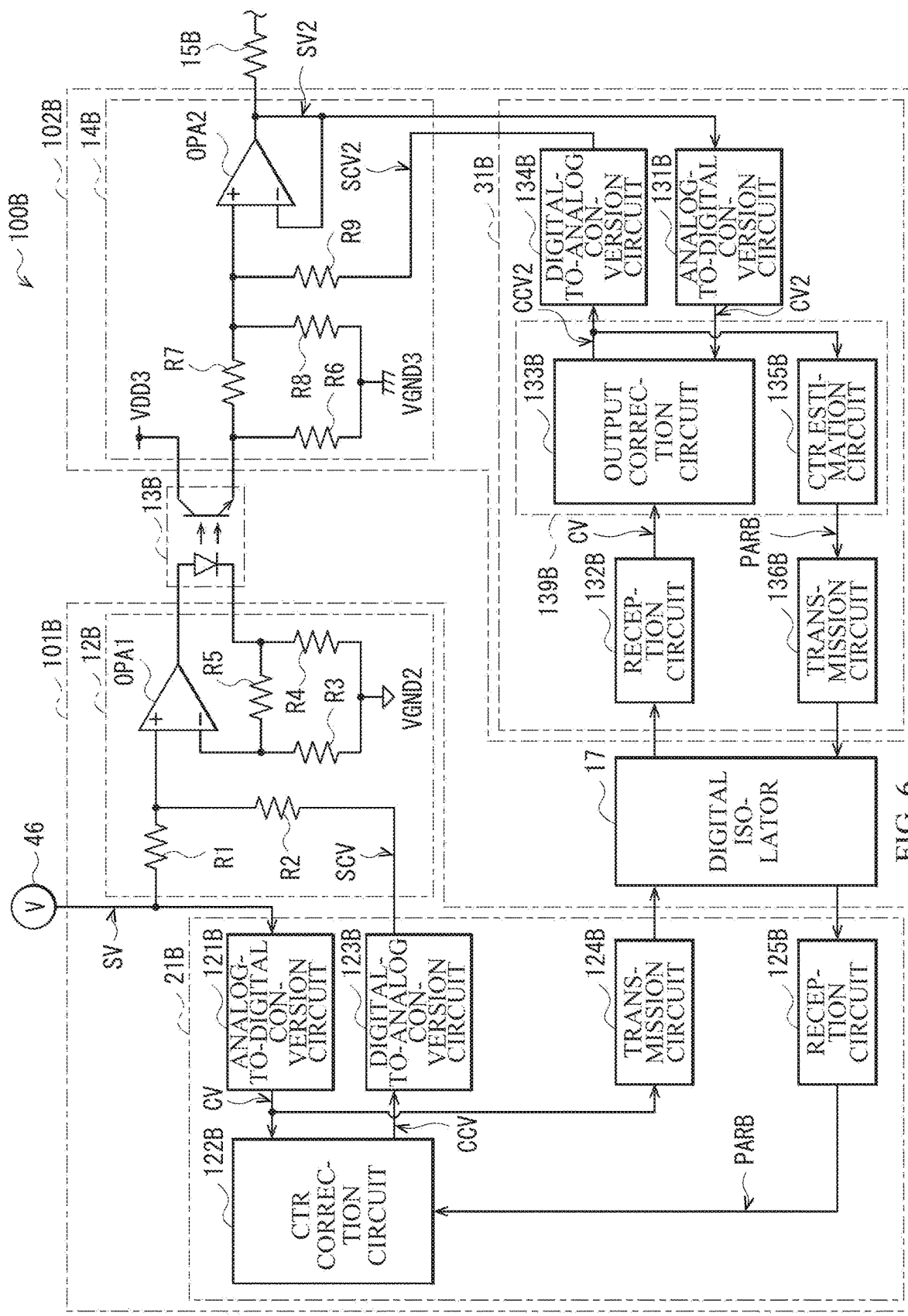
FIG. 6 is a circuit diagram illustrating a configuration example of another corrector and another output circuit illustrated in FIG. 3.

FIG. 6 illustrates a more specific but non-limiting configuration example of the corrector 101B and the output circuit 102B. The corrector 101B, the photocoupler 13B, and the output circuit 102B may configure a signal generation circuit 100B. Based on the detection signal SV in the secondary-side circuitry supplied from the voltage sensor 46, the signal generation circuit 100B may generate the detection signal SV2 in the tertiary-side circuitry corresponding to the detection signal SV, while reducing the influence of the characteristic of the photocoupler 13B.

[Corrector 101B]

As with the correction arithmetic circuit 21A of the corrector 101A illustrated in FIG. 5, the correction arithmetic circuit 21B of the corrector 101B may include an analog-to-digital conversion circuit 121B, a CTR correction circuit 122B, a digital-to-analog conversion circuit 123B, a transmission circuit 124B, and a reception circuit 125B. The analog-to-digital conversion circuit 121B may be configured to generate a detection value CV which is the digital value of the detection signal SV, by performing, based on the detection signal SV supplied from the voltage sensor 46, analog-to-digital conversion at a predetermined sampling frequency. The CTR correction circuit 122B may be configured to generate a correction value CCV, based on the detection value CV and a parameter PARB supplied from the reception circuit 125B. The parameter PARB indicates an estimated value of a current transfer ratio of the photocoupler 13B. The digital-to-analog conversion circuit 123B may be configured to generate the correction signal SCV by performing, based on the correction value CCV generated by the CTR correction circuit 122B, digital-to-analog conversion at a predetermined sampling frequency. The transmission circuit 124B may be configured to transmit the detection value CV generated by the analog-to-digital conversion circuit 121B to the correction arithmetic circuit 31B via the digital isolator 17. The reception circuit 125B may be configured to receive the parameter PARB transmitted from the correction arithmetic circuit 31B via the digital isolator 17, and to supply the CTR correction circuit 122B with the parameter PARB received.

The correction circuit 12B of the corrector 101B may have a configuration similar to that of the correction circuit 12A of the corrector 101A illustrated in FIG. 5. The detection signal SV may be supplied to the first end of the resistor R1.

[Output Circuit 102B]

The correction circuit 14B of the output circuit 102B may be similar to the correction circuit 14A of the output circuit 102A illustrated in FIG. 5. The correction signal SCV2 may be supplied to the first end of the resistor R9. The operational amplifier OPA2 may generate the detection signal SV2.

As with the correction arithmetic circuit 31A of the output circuit 102A illustrated in FIG. 5, the correction arithmetic circuit 31B of the output circuit 102B may include an analog-to-digital conversion circuit 131B, a reception circuit 132B, an output correction circuit 133B, a digital-to-analog conversion circuit 134B, a CTR estimation circuit 135B, and a transmission circuit 136B. The output correction circuit 133B and the CTR estimation circuit 135B may configure a processing circuit 139B. The analog-to-digital conversion circuit 131B may be configured to generate a detection value CV2 which is a digital value of the detection signal SV2, by performing, based on the detection signal SV2, analog-to-digital conversion at a predetermined sampling frequency. The reception circuit 132B may be configured to receive the detection value CV transmitted from the correction arithmetic circuit 21B via the digital isolator 17, and to supply the output correction circuit 133B with the detection value CV received. The output correction circuit 133B may be configured to calculate an expected value of the detection value CV2, based on the detection value CV supplied from the reception circuit 132B, and to generate a correction value CCV2 to cause the detection value CV2 supplied from the analog-to-digital conversion circuit 131B to be equal to the expected value. The digital-to-analog conversion circuit 134B may be configured to generate the correction signal SCV2 by performing, based on the correction value CCV2 generated by the output correction circuit 133B, digital-to-analog conversion at a predetermined sampling frequency. The CTR estimation circuit 135B may be configured to estimate the current transfer ratio of the photocoupler 13B, based on the correction value CCV2. Further, the CTR estimation circuit 135B may supply the parameter PARB indicating the estimated value of the current transfer ratio to the transmission circuit 136B. The transmission circuit 136B may be configured to transmit the parameter PARB generated by the CTR estimation circuit 135B to the correction arithmetic circuit 21B via the digital isolator 17.

The input power terminals Vip and Vin may each correspond to a specific but non-limiting example of an "input power terminal" in one embodiment of the disclosure. The output power terminals Vop and Von may each correspond to a specific but non-limiting example of an "output power terminal" in one embodiment of the disclosure. The current sensor 44 or the voltage sensor 46 may correspond to a specific but non-limiting example of a "sensor" in one embodiment of the disclosure. The isolated power conversion circuit 11 may correspond to a specific but non-limiting example of a "power conversion circuit" in one embodiment of the disclosure. The switching control circuit 23 may correspond to a specific but non-limiting example of a "control circuit" in one embodiment of the disclosure. The signal generation circuit 100A or 100B may correspond to a specific but non-limiting example of a "signal generation circuit" in one embodiment of the disclosure. The detection signal SI or SV may correspond to a specific but non-limiting example of a "first detection signal" in one embodiment of the disclosure. The detection signal SI2 or SV2 may correspond to a specific but non-limiting example of a "second detection signal" in one embodiment of the disclosure. The corrector 101A or 101B may correspond to a specific but non-limiting example of a "corrector" in one embodiment of the disclosure. The photocoupler 13A or 13B may correspond to a specific but non-limiting example of a "photocoupler" in one embodiment of the disclosure. The output circuit 102A or 102B may correspond to a specific but non-limiting example of an "output circuit" in one embodiment of the disclosure. The analog-to-digital conversion circuit 121A or 121B may correspond to a specific but non-limiting example of a "first analog-to-digital conversion circuit" in one embodiment of the disclosure. The detection value CI or CV may correspond to a specific but non-limiting example of a "first digital value" in one embodiment of the disclosure. The digital isolator 17 may correspond to a specific but non-limiting example of a "digital isolator" in one embodiment of the disclosure. The analog-to-digital conversion circuit 131A or 131B may correspond to a specific but non-limiting example of a "second analog-to-digital conversion circuit" in one embodiment of the disclosure. The detection value CI2 or CV2 may correspond to a specific but non-limiting example of a "second digital value" in one embodiment of the disclosure. The processing circuit 139A or 139B may correspond to a specific but non-limiting example of a "processing circuit" in one embodiment of the disclosure. The parameter PARA or PARB may correspond to a specific but non-limiting example of a "parameter" in one embodiment of the disclosure. The balance terminals Vbi and Vbv may each correspond to a specific but non-limiting example of a "signal terminal" in one embodiment of the disclosure.

[Operation and Workings]

Operation and workings of the power conversion system 1 according to the present example embodiment will now be described.

[Outline of Overall Operation]

First, an outline of overall operation of the power conversion system 1 will be described with reference to FIGS. 1 and 3. In each of the four power conversion apparatuses 10, the isolated power conversion circuit 11 converts direct-current electric power supplied via the input power terminals Vip and Vin, and outputs the converted direct-current electric power via the output power terminals Vop and Von.

Based on the detection signal SI supplied from the current sensor 44, the signal generation circuit 100A including the corrector 101A, the photocoupler 13A, and the output circuit 102A may generate the detection signal SI2 corresponding to the detection signal SI, while reducing the influence of the characteristic of the photocoupler 13A. The signal generation circuit 100A may supply, to the first end of the resistor 15A, the detection signal SI2 generated. The voltage at the balance terminal Vbi is the average voltage of the detection signals SI2 of the four power conversion apparatuses 10.

Based on the detection signal SV supplied from the voltage sensor 46, the signal generation circuit 100B including the corrector 101B, the photocoupler 13B, and the output circuit 102B may generate the detection signal SV2 corresponding to the detection signal SV, while reducing the influence of the characteristic of the photocoupler 13B. The signal generation circuit 100B may supply, to the first end of the resistor 15B, the detection signal SV2 generated. The voltage at the balance terminal Vbv is the average voltage of the detection signals SV2 of the four power conversion apparatuses 10.

The amplifier 16A may amplify the voltage difference across the resistor 15A to thereby generate the difference signal Sdfi. The amplifier 16B may amplify the voltage difference across the resistor 15B to thereby generate the difference signal Sdfv. Based on the digital value of the difference signal Sdfi, the adjustment arithmetic circuit 32A may generate the difference value Cdfi that varies depending on the difference signal Sdfi. Based on the digital value of the difference signal Sdfv, the adjustment arithmetic circuit 32B may generate the difference value Cdfv that varies depending on the difference signal Sdfv. The command value generation circuit 33 may generate the voltage command value CMV of the output voltage Vout of the power conversion apparatus 10 and the current comment value CMI of the output current Iout of the power conversion apparatus 10. The adder circuit 34A may generate the voltage command value CMV2 by adding up the difference value Cdfi and the voltage command value CMV. The adder circuit 34B may generate the current command value CMI2 by adding up the difference value Cdfv and the current command value CMI. The error amplifier 22A may generate the error value Cerv by amplifying the difference between the voltage command value CMV2 and the digital value of the detection signal SV. The error amplifier 22B may generate the error value Ceri by amplifying the difference between the current command value CMI2 and the digital value of the detection signal SI. The switching control circuit 23 may generate, based on the error values Cerv and Ceri, the gate signal SG1 and may control the operation of the isolated power conversion circuit 11, based on the gate signal SG1. The isolated drive circuit 18 may generate, based on the gate signal SG1, the gate signal SG and may drive the transistors SW1 and SW2 of the isolated power conversion circuit 11, based on the gate signal SG.

[Detailed Operation]

Based on the detection signal SI supplied from the current sensor 44, the signal generation circuit 100A including the corrector 101A, the photocoupler 13A, and the output circuit 102A may generate the detection signal SI2 corresponding to the detection signal SI, while reducing the influence of the characteristic of the photocoupler 13A. This operation will be described in detail below.

In the secondary-side circuitry, as illustrated in FIG. 5, the analog-to-digital conversion circuit 121A may generate the detection value CI which is the digital value of the detection signal SI, by performing, based on the detection signal SI supplied from the current sensor 44, analog-to-digital conversion at the predetermined sampling frequency. The transmission circuit 124A may transmit the detection value CI to the tertiary-side circuitry via the digital isolator 17. The reception circuit 125A may receive the parameter PARA transmitted from the tertiary-side circuitry via the digital isolator 17. The CTR correction circuit 122A may generate the correction value CCI, based on the detection value CI and the parameter PARA indicating the estimated value of the current transfer ratio of the photocoupler 13A supplied from the reception circuit 125A. The correction value CCI may be, for example, proportional to the detection value CI and may vary depending on the detection value CI. For example, the CTR correction circuit 122A may make the correction value CCI large when the estimated value of the current transfer ratio is small, and may make the correction value CCI small when the estimated value of the current transfer ratio is large. Based on the correction value CCI generated by the CTR correction circuit 122A, the digital-to-analog conversion circuit 123A may perform digital-to-analog conversion at the predetermined sampling frequency to thereby generate the correction signal SCI.

The correction circuit 12A may correct the detection signal SI, based on the correction signal SCI generated by the digital-to-analog conversion circuit 123A, and may drive the photocoupler 13A, based on the detection signal SI corrected.

The light emitting device of the photocoupler 13A emits light at a luminance corresponding to the signal supplied from the correction circuit 12A. The light receiving device receives the light emitted by the light emitting device, and may supply the correction circuit 14A with the light reception signal corresponding to the amount of the light received from the light emitting device.

In the tertiary-side circuitry, the correction circuit 14A may generate the detection signal SI2 corresponding to the light reception signal supplied from the photocoupler 13A, and may correct the detection signal SI2, based on the correction signal SCI2 supplied from the correction arithmetic circuit 31A.

The analog-to-digital conversion circuit 131A may generate the detection value CI2 which is the digital value of the detection signal SI2, by performing, based on the detection signal SI2 generated by the correction circuit 14A, analog-to-digital conversion at the predetermined sampling frequency. The reception circuit 132A may receive the detection value CI transmitted from the secondary-side circuitry via the digital isolator 17. Based on the detection value CI supplied from the reception circuit 132A, the output correction circuit 133A may calculate an expected value of the detection value CI2 and may generate the correction value CCI2 to cause the detection value CI2 supplied from the analog-to-digital conversion circuit 131A to be equal to the expected value. The digital-to-analog conversion circuit 134A may generate the correction signal SCI2 by performing, based on the correction value CCI2 generated by the output correction circuit 133A, digital-to-analog conversion at the predetermined sampling frequency. The correction circuit 14A may correct the detection signal SI2, based on the correction signal SCI2.

Based on the correction value CCI2 generated by the output correction circuit 133A, the CTR estimation circuit 135A may estimate the current transfer ratio of the photocoupler 13A to thereby generate the parameter PARA indicating the estimated value of the current transfer ratio. The transmission circuit 124A may transmit the parameter PARA to the secondary-side circuitry via the digital isolator 17.

Figure 7:
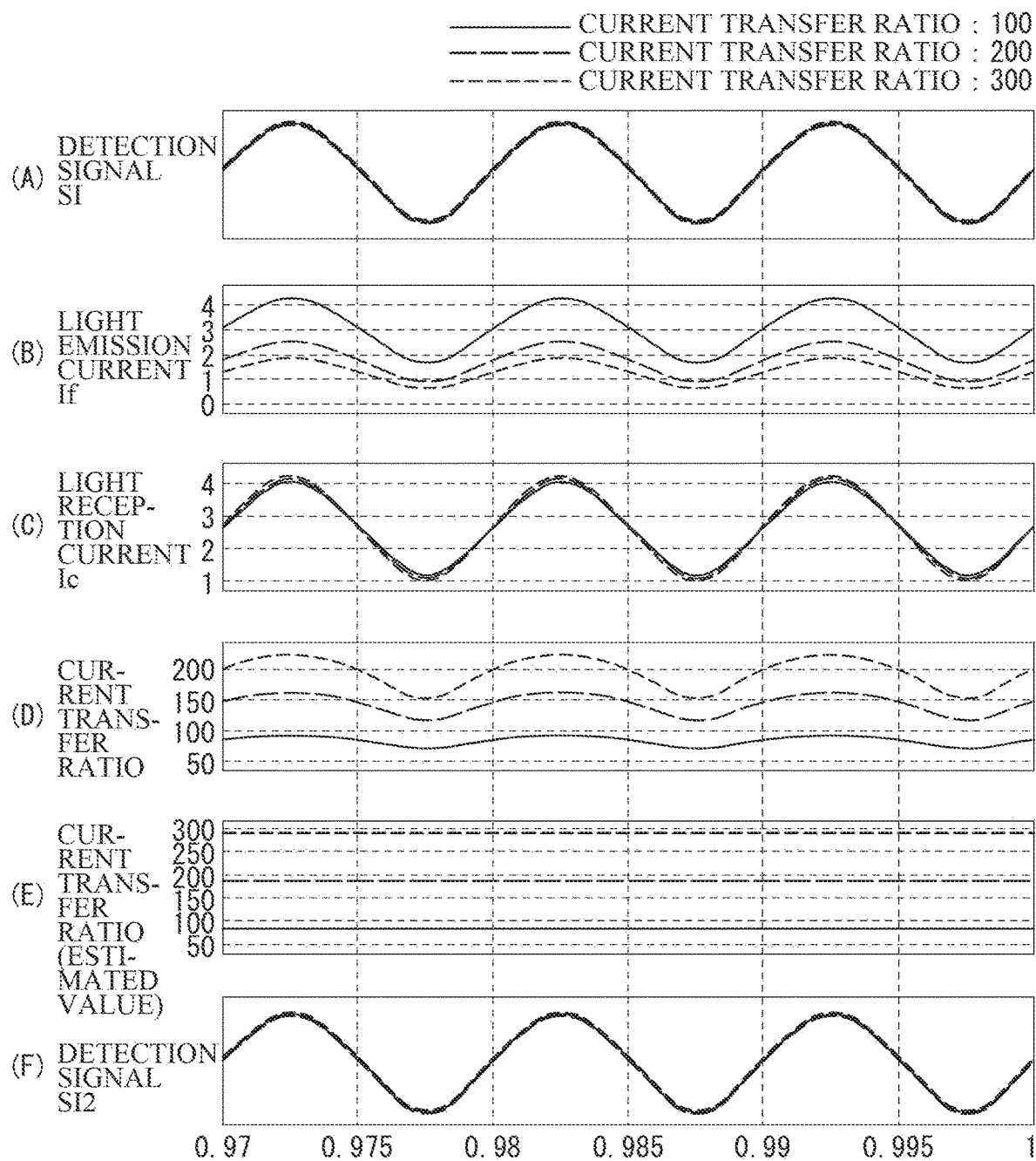
FIG. 7 is a waveform diagram illustrating a characteristic example of a signal generation circuit illustrated in FIG. 5.

FIG. 7 illustrates an operation example of the signal generation circuit 100A. Part (A) of FIG. 7 illustrates an example waveform of the detection signal SI. Part (B) of FIG. 7 illustrates an example waveform of a light emission current If, i.e., a current flowing through the light emitting device of the photocoupler 13A. Part (C) of FIG. 7 illustrates an example waveform of a light reception current Ic, i.e., a current flowing through the light receiving device of the photocoupler 13A. Part (D) of FIG. 7 illustrates an example of the current transfer ratio of the photocoupler 13A. Part (E) of FIG. 7 illustrates an example of the estimated value of the current transfer ratio of the photocoupler 13A estimated by the CTR estimation circuit 135A. Part (F) of FIG. 7 illustrates an example waveform of the detection signal SI2. FIG. 7 illustrates respective characteristics of the photocoupler 13A when the current transfer ratio of the photocoupler 13A is "100", when the current transfer ratio of the photocoupler 13A is "200", and when the current transfer ratio of the photocoupler 13A is "300". Note that the current transfer ratio of the photocoupler 13A may vary also depending on an operating point of the photocoupler 13A, as indicated in part (D) of FIG. 7.

In the output circuit 102A, the CTR estimation circuit 135A of the correction arithmetic circuit 31A may estimate the current transfer ratio of the photocoupler 13A. See part (E) of FIG. 7.

In the corrector 101A, the correction arithmetic circuit 21A may generate the correction signal SCI, based on the detection signal SI illustrated in part (A) of FIG. 7 and the estimated value of the current transfer ratio of the photocoupler 13A. The detection signal SI may have a sinusoidal shape in the example embodiment, although it is not limited thereto. The correction circuit 12A may correct the detection signal SI, based on the correction signal SCI generated by the digital-to-analog conversion circuit 123A, and may drive the photocoupler 13A, based on the detection signal SI corrected. As a result, as illustrated in part (B) of FIG. 7, the light emission current If flowing through the light emitting device of the photocoupler 13A varies depending on the current transfer ratio. For example, the light emission current If may be a large current when the current transfer ratio is "100", and may be a small current when the current transfer ratio is "300".

The light emitting device of the photocoupler 13A emits light at a luminance corresponding to the signal supplied from the correction circuit 12A. The light receiving device of the photocoupler 13A receives the light emitted by the light emitting device, and may supply the correction circuit 14A with the light reception signal corresponding to the amount of the light received from the light emitting device.

As illustrated in part (C) of FIG. 7, the light reception current Ic flowing through the light receiving device of the photocoupler 13B is substantially independent of the current transfer ratio. For example, the signal generation circuit 100A may make the light emission current If large when the current transfer ratio is "100", and make the light emission current If small when the current transfer ratio is "300", thereby reducing the influence of the current transfer ratio on the light reception current Ic.

In the output circuit 102A, the correction circuit 14A may generate the detection signal SI2 corresponding to the light reception current Ic, and may correct the detection signal SI2, based on the correction signal SCI2 supplied from the correction arithmetic circuit 31A. In such a manner, the output circuit 102A may generate the detection signal SI2. See part (F) of FIG. 7.

In the signal generation circuit 100A, the corrector 101A may perform correction processing on the detection signal SI and drive the light emitting device of the photocoupler 13A, based on the detection signal SI having undergone the correction processing. This makes it possible for the signal generation circuit 100A to reduce the influence of the current transfer ratio of the photocoupler 13A on the detection signal SI2, as compared with a comparative example described below.

Comparative Example

A signal generation circuit 100R according to a comparative example will now be described. The signal generation circuit 100R differs from the signal generation circuit 100A in that no correction is performed on the detection signal SI in a stage preceding the photocoupler 13A.

Figure 8:
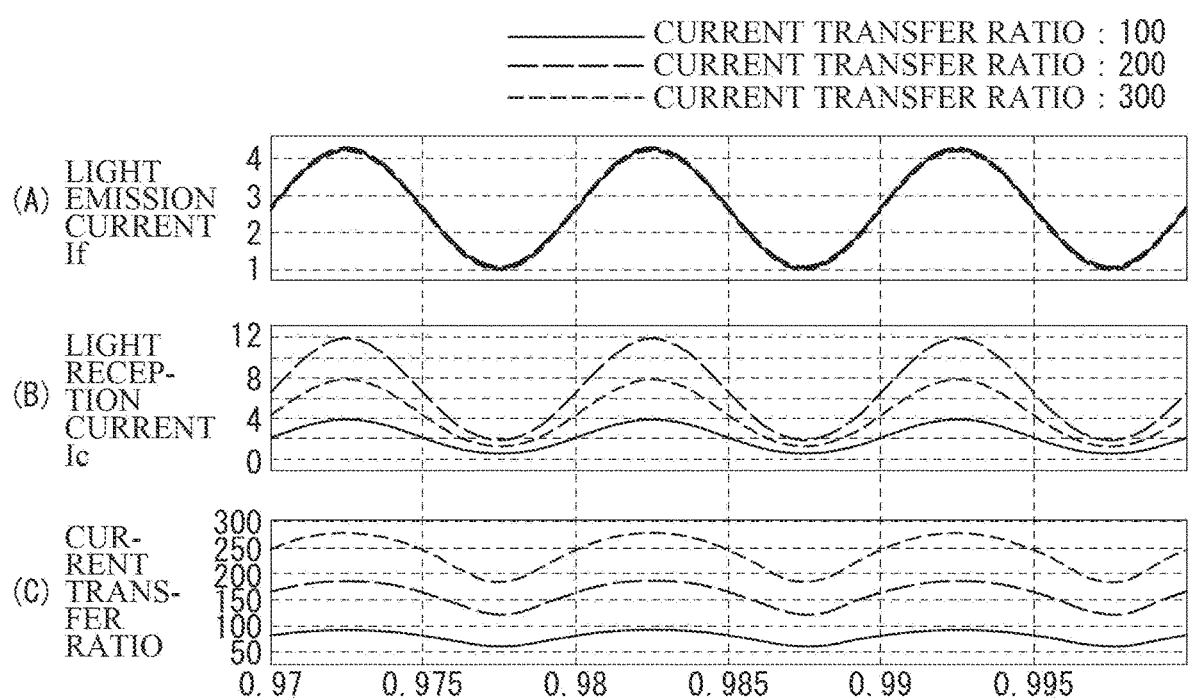
FIG. 8 is a waveform diagram illustrating a characteristic example of a signal generation circuit according to a comparative example.

FIG. 8 illustrates an operation example of the signal generation circuit 100R. Part (A) of FIG. 8 illustrates an example waveform of the light emission current If, i.e., a current flowing through the light emitting device of the photocoupler 13A. Part (B) of FIG. 8 illustrates an example waveform of the light reception current Ic, i.e., a current flowing through the light receiving device of the photocoupler 13A. Part (C) of FIG. 8 illustrates an example of the current transfer ratio of the photocoupler 13A.

In the signal generation circuit 100R, no correction is performed on the detection signal SI in the stage preceding the photocoupler 13A, and the light emission current If corresponding to the detection signal SI flows through the light emitting device of the photocoupler 13A accordingly. See part (A) of FIG. 8. The light emission current If is substantially independent of the current transfer ratio.

In contrast, the light reception current Ic of the light receiving device of the photocoupler 13A varies depending on the current transfer ratio. See part (B) of FIG. 8. For example, the light reception current Ic is small when the current transfer ratio is "100", and is large when the current transfer ratio is "300".

For example, when the current transfer ratio is "300", the light reception current Ic is large and the correction signal SCI2 is relatively small in a stage following the photocoupler 13A accordingly. In other words, the light reception signal of the photocoupler 13A is dominant as compared with the correction signal SCI2. In such a case, the detection signal SI2 is generated based on the light reception signal of the photocoupler 13A.

For example, when the current transfer ratio is "100", the light reception current Ic is small and therefore the correction signal SCI2 can become dominant in the stage following the photocoupler 13A. In such a case, the detection signal SI2 is generated based on the correction signal SCI2. The correction signal SCI2 may be generated through communication between the correction arithmetic circuit 21A and the correction arithmetic circuit 31A via the digital isolator 17. Accordingly, a delay can result from the communication or arithmetic processing, which can cause the detection signal SI2 to lag in timing behind the detection signal SI.

Thus, according to the signal generation circuit 100R of the comparative example, a characteristic of the detection signal SI2 can differ depending on the current transfer ratio. The detection signal SI2 is a signal corresponding to the output current Iout of the power conversion apparatus 10. In the signal generation circuit 100R, detection accuracy for the output current Iout can thus be degraded depending on the current transfer ratio.

In contrast, in the signal generation circuit 100A according to the present example embodiment, the corrector 101A may perform the correction processing on the detection signal SI and drive, based on the detection signal SI having undergone the correction processing, the light emitting device of the photocoupler 13A. This makes it possible to maintain the light reception current Ic not to become small irrespective of the current transfer ratio, as illustrated in FIG. 7. Accordingly, for example, at the correction circuit 14A disposed in the stage following the photocoupler 13A, it is possible to make the light reception signal of the photocoupler 13A sufficiently large as compared with the correction signal SCI2. This causes the detection signal SI2 to be a signal corresponding to the detection signal SI irrespective of the current transfer ratio of the photocoupler 13A. As a result, the signal generation circuit 100A makes it possible to increase the detection accuracy for the output current Iout.

The foregoing description has dealt with the signal generation circuit 100A as an example; however, a similar description applies to the signal generation circuit 100B. Accordingly, the signal generation circuit 100B makes it possible to increase detection accuracy for the output voltage Vout.

According to the example embodiment described above, the power conversion apparatus 10 includes the input power terminals Vip and Vin, the output power terminals Vop and Von, the isolated power conversion circuit 11, the signal generation circuit 100A, and the switching control circuit 23. The isolated power conversion circuit 11 converts electric power supplied via the input power terminals Vip and Vin, and outputs converted electric power via the output power terminals Vop and Von. The isolated power conversion circuit 11 includes the current sensor 44 that generates the detection signal SI corresponding to the output current. The signal generation circuit 100A generates the detection signal SI2 corresponding to the detection signal SI. The switching control circuit 23 controls the operation of the isolated power conversion circuit 11. The signal generation circuit 100A includes the corrector 101A, the photocoupler 13A, and the output circuit 102A. The corrector 101A performs correction processing on the detection signal SI. The photocoupler 13A includes the light emitting device and the light receiving device. The light emitting device emits light at a luminance corresponding to the detection signal SI having undergone the correction processing. The light receiving device receives the light emitted by the light emitting device and generates the light reception signal corresponding to the amount of the light received from the light emitting device. The output circuit 102A outputs the detection signal SI2 corresponding to the light reception signal. The corrector 101A performs the correction processing corresponding to the current transfer ratio of the photocoupler 13A. As a result, it is possible for the power conversion apparatus 10 to maintain the light reception current Ic not to become small irrespective of the current transfer ratio of the photocoupler 13A, as illustrated in FIG. 7. Accordingly, it is possible to increase the detection accuracy for the output current Iout.

In some embodiments, the signal generation circuit 100A may include the analog-to-digital conversion circuit 121A, the digital isolator 17, the analog-to-digital conversion circuit 131A, and the processing circuit 139A. The analog-to-digital conversion circuit 121A may generate the detection value CI by performing analog-to-digital conversion on the detection signal SI. The analog-to-digital conversion circuit 131A may generate the detection value CI2 by performing analog-to-digital conversion on the detection signal SI2. Based on the detection value CI supplied via the digital isolator 17 and the detection value CI2, the processing circuit 139A may estimate the current transfer ratio and may generate the parameter PARA corresponding to the estimated current transfer ratio. The corrector 101A may perform, based on the parameter PARA, the correction processing corresponding to the current transfer ratio. It is thus possible for the signal generation circuit 100A to perform the correction processing on the detection signal SI using the estimated current transfer ratio. Accordingly, for example, even when the current transfer ratio changes with temperature or with time, the corrector 101A is able to perform the correction processing effectively on the detection signal SI, in accordance with the change. This makes it possible for the power conversion apparatus 10 to increase the detection accuracy for the output current Iout.

In some embodiments, the power conversion apparatus 10 may further include the balance terminal Vbi led to a terminal, the terminal allowing for output of the detection signal SI2 of the signal generation circuit 100A. In addition, the switching control circuit 23 may control the operation of the isolated power conversion circuit 11, based on the voltage at the balance terminal Vbi and the voltage of the detection signal SI2. As a result, for example, when a plurality of power conversion apparatuses 10 is provided, it is possible to make the respective output currents Iout of the power conversion apparatuses 10 substantially equal to each other.

In some embodiments, the plurality of power conversion apparatuses 10 may include the power conversion apparatus 10A and the power conversion apparatus 10B, for example. The power conversion apparatus 10A may include the output power terminal Vop coupled to the power node N1 led to the power terminal T21, and the output power terminal Von coupled to the power node N2. The power conversion apparatus 10B may include the output power terminal Vop coupled to the power node N1, and the output power terminal Von coupled to the power node N2. In other words, the power conversion apparatuses 10A and 10B may be coupled in parallel to each other. In such a case, it is possible to make the output current Tout of the power conversion apparatus 10A and the output current Tout of the power conversion apparatus 10B substantially equal to each other.

In the power conversion apparatus 10 according to the example embodiment, the isolated power conversion circuit 11 includes the voltage sensor 46 that generates the detection signal SV corresponding to the output voltage. In addition, the power conversion apparatus 10 includes the signal generation circuit 100B that generates the detection signal SV2 corresponding to the detection signal SV. The signal generation circuit 100B includes the corrector 101B, the photocoupler 13B, and the output circuit 102B. The corrector 101B performs correction processing on the detection signal SV. The photocoupler 13B includes the light emitting device and the light receiving device. The light emitting device emits light at a luminance corresponding to the detection signal SV having undergone the correction processing. The light receiving device receives the light emitted by the light emitting device and generates the light reception signal corresponding to the amount of the light received from the light emitting device. The output circuit 102B outputs the detection signal SV2 corresponding to the light reception signal. The corrector 101B performs the correction processing corresponding to the current transfer ratio of the photocoupler 13B. As a result, it is possible for the power conversion apparatus 10 to maintain the light reception current Ic not to become small irrespective of the current transfer ratio of the photocoupler 13B. Accordingly, it is possible to increase the detection accuracy for the output voltage Vout.

In some embodiments, the signal generation circuit 100B may include the analog-to-digital conversion circuit 121B, the digital isolator 17, the analog-to-digital conversion circuit 131B, and the processing circuit 139B. The analog-to-digital conversion circuit 121B may generate the detection value CV by performing analog-to-digital conversion on the detection signal SV. The analog-to-digital conversion circuit 131B may generate the detection value CV2 by performing analog-to-digital conversion on the detection signal SV2. Based on the detection value CV supplied via the digital isolator 17 and the detection value CV2, the processing circuit 139B may estimate the current transfer ratio and may generate the parameter PARB corresponding to the estimated current transfer ratio. The corrector 101B may perform, based on the parameter PARB, the correction processing corresponding to the current transfer ratio. It is thus possible for the signal generation circuit 100B to perform the correction processing on the detection signal SV using the estimated current transfer ratio. Accordingly, for example, even when the current transfer ratio changes with temperature or with time, the corrector 101B is able to perform the correction processing effectively on the detection signal SV, in accordance with the change. This makes it possible for the power conversion apparatus 10 to increase the detection accuracy for the output voltage Vout.

In some embodiments, the power conversion apparatus 10 may further include the balance terminal Vbv led to a terminal, the terminal allowing for output of the detection signal SV2 of the signal generation circuit 100B. In addition, the switching control circuit 23 may control the operation of the isolated power conversion circuit 11, based on the voltage at the balance terminal Vbv and the voltage of the detection signal SV2. As a result, for example, when a plurality of power conversion apparatuses 10 is provided, it is possible to make the respective output voltages Vout of the power conversion apparatuses 10 substantially equal to each other.

In some embodiments, the plurality of power conversion apparatuses 10 may include the power conversion apparatus 10A and the power conversion apparatus 10C, for example. The power conversion apparatus 10A may include the output power terminal Vop coupled to the power node N1 led to the power terminal T21, and the output power terminal Von coupled to the power node N2. The power conversion apparatus 10C may include the output power terminal Vop coupled to the power node N2, and the output power terminal Von coupled to the power node N3 led to the power terminal T22. In other words, the power conversion apparatuses 10A and 10C may be coupled in series to each other. In such a case, it is possible to make the output voltage Vout of the power conversion apparatus 10A and the output voltage Vout of the power conversion apparatus 10C substantially equal to each other.

Example Effects

The foregoing example embodiment includes the input power terminal, the output power terminal, the isolated power conversion circuit, the signal generation circuit, and the switching control circuit. The isolated power conversion circuit converts electric power supplied via the input power terminal, and outputs the converted electric power via the output power terminal. The isolated power conversion circuit includes the current sensor that generates the detection signal SI corresponding to the output current. The signal generation circuit generates the detection signal SI2 corresponding to the detection signal SI. The switching control circuit controls the operation of the isolated power conversion circuit. The signal generation circuit includes the corrector, the photocoupler, and the output circuit. The corrector performs correction processing on the detection signal SI. The photocoupler includes the light emitting device and the light receiving device. The light emitting device emits light at a luminance corresponding to the detection signal SI having undergone the correction processing. The light receiving device receives the light emitted by the light emitting device and generates the light reception signal corresponding to the amount of the light received from the light emitting device. The output circuit outputs the detection signal SI2 corresponding to the light reception signal. The corrector performs the correction processing corresponding to the current transfer ratio of the photocoupler. This helps to increase the detection accuracy for the output current.

In some embodiments, the signal generation circuit may include the analog-to-digital conversion circuit 121A, the digital isolator, the analog-to-digital conversion circuit 131A, and the processing circuit. The analog-to-digital conversion circuit 121A may generate the detection value CI by performing analog-to-digital conversion on the detection signal SI. The analog-to-digital conversion circuit 131A may generate the detection value CI2 by performing analog-to-digital conversion on the detection signal SI2. The processing circuit may, based on the detection value CI supplied via the digital isolator and the detection value CI2, estimate the current transfer ratio and may generate the parameter corresponding to the estimated current transfer ratio. The corrector may perform, based on the parameter, the correction processing corresponding to the current transfer ratio. This helps to increase the detection accuracy for the output current.

In some embodiments, the isolated power conversion circuit includes the voltage sensor that generates the detection signal SV corresponding to the output voltage. In addition, the signal generation circuit is provided that generates the detection signal SV2 corresponding to the detection signal SV. The signal generation circuit includes the corrector, the photocoupler, and the output circuit. The corrector performs correction processing on the detection signal SV. The photocoupler includes the light emitting device and the light receiving device. The light emitting device emits light at a luminance corresponding to the detection signal SV having undergone the correction processing. The light receiving device receives the light emitted by the light emitting device and generates the light reception signal corresponding to the amount of the light received from the light emitting device. The output circuit outputs the detection signal SV2 corresponding to the light reception signal. The corrector performs the correction processing corresponding to the current transfer ratio of the photocoupler. This helps to increase the detection accuracy for the output voltage.

In some embodiments, the signal generation circuit may include the analog-to-digital conversion circuit 121B, the digital isolator, the analog-to-digital conversion circuit 131B, and the processing circuit. The analog-to-digital conversion circuit 121B may generate the detection value CV by performing analog-to-digital conversion on the detection signal SV. The analog-to-digital conversion circuit 131B may generate the detection value CV2 by performing analog-to-digital conversion on the detection signal SV2. The processing circuit may, based on the detection value CV supplied via the digital isolator 17 and the detection value CV2, estimate the current transfer ratio and may generate the parameter corresponding to the estimated current transfer ratio. The corrector may perform, based on the parameter, the correction processing corresponding to the current transfer ratio. This helps to increase the detection accuracy for the output voltage.

Modification Example 1

In the foregoing example embodiment, the power conversion apparatus 10 may include the isolated power conversion circuit 11; however, this is non-limiting. In some embodiments, the power conversion apparatus may include a non-isolated power conversion circuit. A power conversion system 2 according to the present modification example will be described in detail below.

Figure 9:
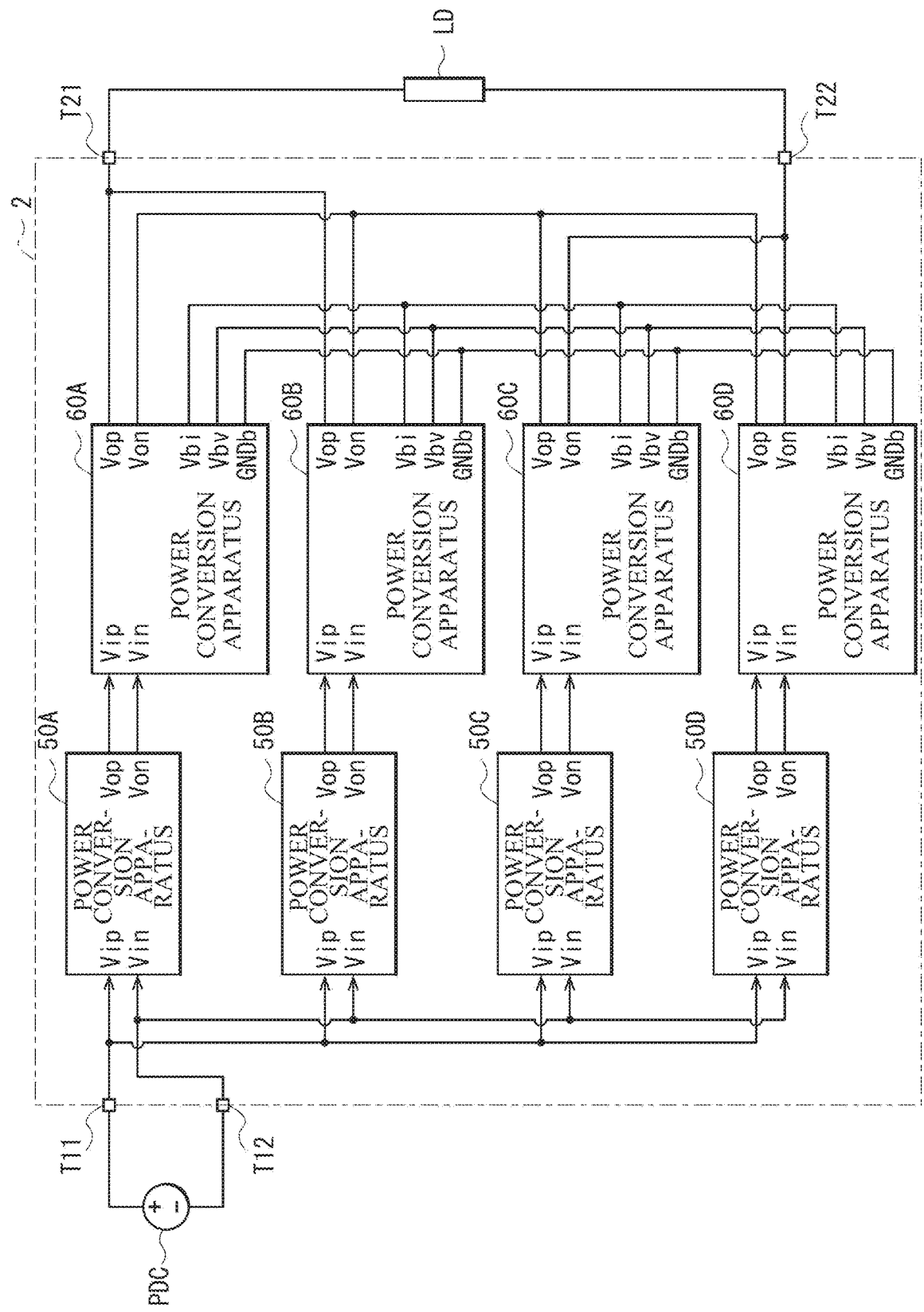
FIG. 9 is a block diagram illustrating a configuration example of a power conversion system according to a modification example.

FIG. 9 illustrates a configuration example of the power conversion system 2. The power conversion system 2 may include a plurality of power conversion apparatuses 50 and a plurality of power conversion apparatuses 60. In this modification example, the power conversion system 2 may include four power conversion apparatuses 50A, 50B, 50C, and 50D, and four power conversion apparatuses 60A, 60B, 60C, and 60D, although they are not limited thereto. The four power conversion apparatuses 50 and the four power conversion apparatuses 60 may be provided in correspondence with each other.

The four power conversion apparatuses 50 may each be an isolated DC-to-DC conversion circuit. The power conversion apparatuses 50 each include the input power terminals Vip and Vin and the output power terminals Vop and Von. The respective input power terminals Vip of the power conversion apparatuses 50A to 50D may be coupled to each other, and may also be coupled to the power terminal T11. The respective input power terminals Vin of the power conversion apparatuses 50A to 50D may be coupled to each other, and may also be coupled to the power terminal T12. The output power terminal Vop of each of the power conversion apparatuses 50 may be coupled to the input power terminal Vip of corresponding one of the power conversion apparatuses 60. The output power terminal Von of each of the power conversion apparatuses 50 may be coupled to the input power terminal Vin of corresponding one of the power conversion apparatuses 60. The power conversion apparatuses 50 may each be an isolated circuit, and may therefore include primary-side circuitry, a transformer, and secondary-side circuitry, as with the isolated power conversion circuit 11 illustrated in FIG. 4, for example.

The four power conversion apparatuses 60 may each be a non-isolated DC-to-DC conversion circuit. The power conversion apparatuses 60 may each include the input power terminals Vip and Vin, the output power terminals Vop and Von, the balance terminals Vbi and Vbv, and the reference terminal GNDb.

The input power terminal Vip of each of the power conversion apparatuses 60 may be coupled to the output power terminal Vop of corresponding one of the power conversion apparatuses 50. The input power terminal Vin of each of the power conversion apparatuses 60 may be coupled to the output power terminal Von of corresponding one of the power conversion apparatuses 50.

The output power terminals Vop and Von of the power conversion apparatuses 60 may be coupled in a manner similar to that in the power conversion system 1 according to the foregoing example embodiment illustrated in FIG. 1. For example, the respective output power terminals Vop of the power conversion apparatuses 60A and 60B may be coupled to each other, and may also be coupled to the power terminal T21. The respective output power terminals Von of the power conversion apparatuses 60A and 60B may be coupled to each other, and may also be coupled to the output power terminal Vop of each of the power conversion apparatuses 60C and 60D. The respective output power terminals Vop of the power conversion apparatuses 60C and 60D may be coupled to each other, and may also be coupled to the output power terminal Von of each of the power conversion apparatuses 60A and 60B. The respective output power terminals Von of the power conversion apparatuses 60C and 60D may be coupled to each other, and may also be coupled to the power terminal T22. In the power conversion system 2, as in the power conversion system 1 according to the foregoing example embodiment (see FIG. 2), the power conversion apparatuses 60A and 60B may be coupled in parallel, and the power conversion apparatuses 60C and 60D may be coupled in parallel. Further, the power conversion apparatuses 60A and 60B and the power conversion apparatuses 60C and 60D may be coupled in series.

The respective balance terminals Vbi of the power conversion apparatuses 60A to 60D are couped to each other. The respective balance terminals Vbv of the power conversion apparatuses 60A to 60D are couped to each other. The respective reference terminals GNDb of the power conversion apparatuses 60A to 60D may be couped to each other.

Figure 10:
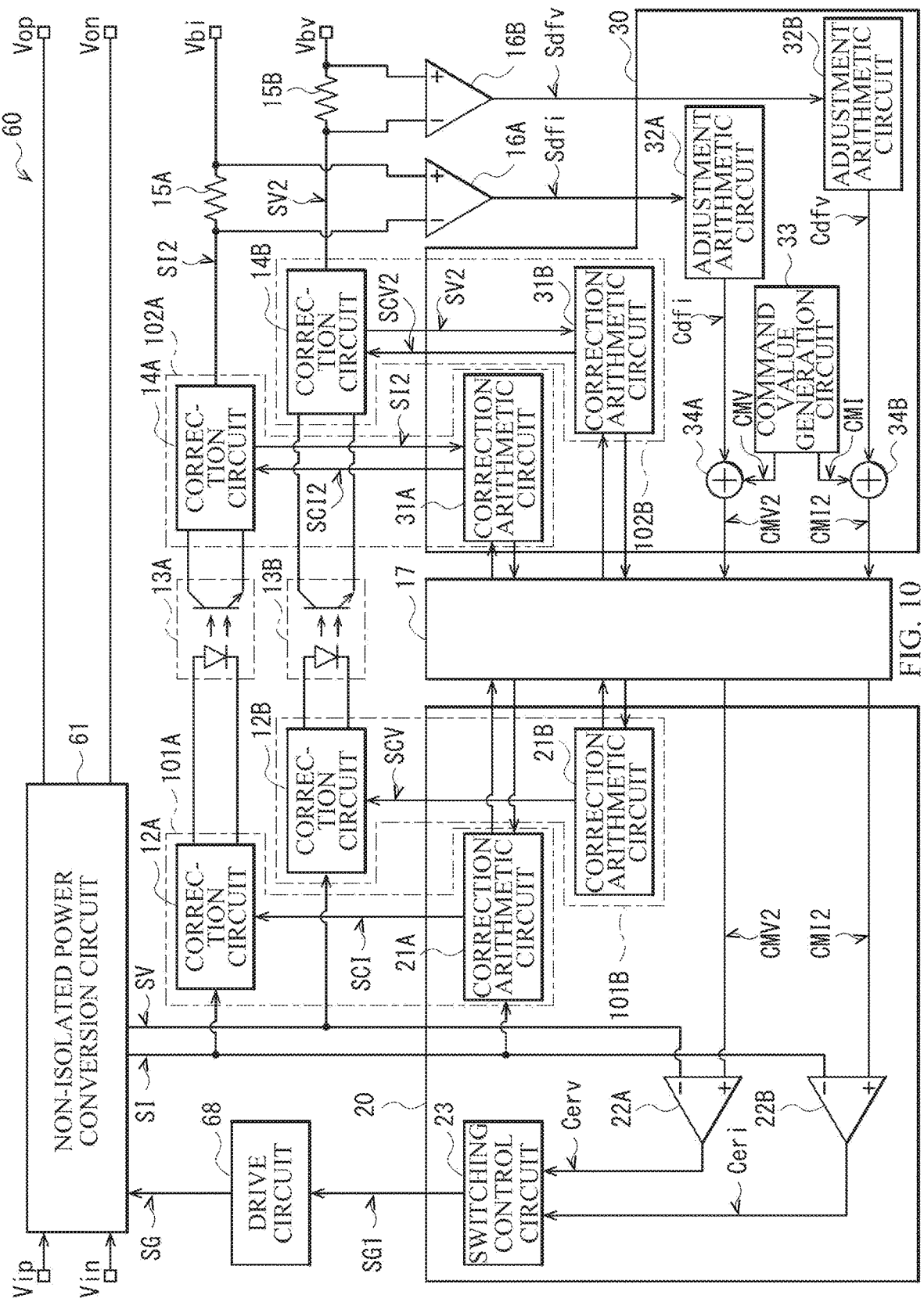
FIG. 10 is a block diagram illustrating a configuration example of each of power conversion apparatuses illustrated in FIG. 9.

FIG. 10 illustrates a configuration example of the power conversion apparatus 60. The power conversion apparatus 60 may include a non-isolated power conversion circuit 61 and a drive circuit 68.

Figure 11:
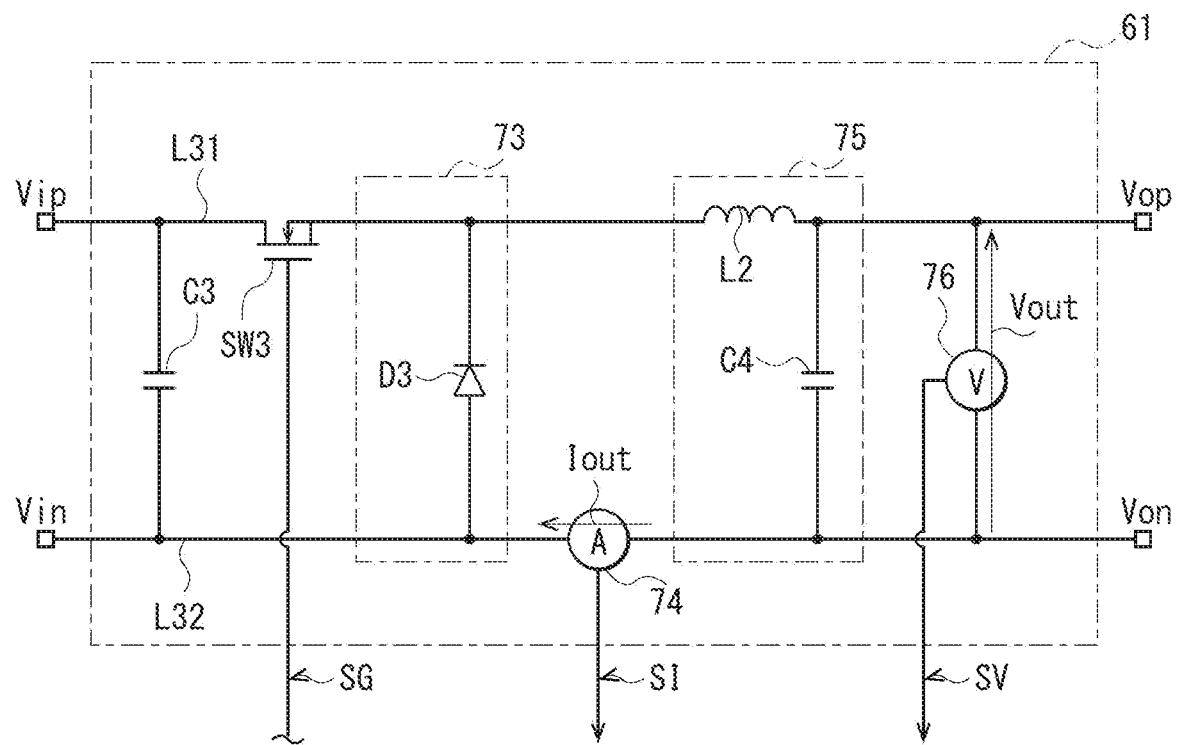
FIG. 11 is a circuit diagram illustrating a configuration example of a non-isolated power conversion circuit illustrated in FIG. 10.

FIG. 11 illustrates a configuration example of the non-isolated power conversion circuit 61. The non-isolated power conversion circuit 61 may include a capacitor C3, a transistor SW3, a rectifier circuit 73, a current sensor 74, a smoothing circuit 75, and a voltage sensor 76.

The capacitor C3 may have a first end coupled to a voltage line L31, and a second end coupled to a reference voltage line L32. The voltage line L31 may be led to the input power terminal Vip and the output power terminal Vop. The reference voltage line L32 may be led to the input power terminal Vin and the output power terminal Von. The transistor SW3 may be an N-type field-effect transistor in this modification example, although it is not limited thereto. The transistor SW3 may be provided on the voltage line L31. The transistor SW3 may have a gate to be supplied with the gate signal SG, a drain coupled to the first end of the capacitor C3, and a source coupled to the rectifier circuit 73. The rectifier circuit 73 may include a diode D3. The diode D3 may have an anode coupled to the reference voltage line L32, and a cathode coupled to the source of the transistor SW3 on the voltage line L31. The current sensor 74 may be configured to detect the output current Tout of the power conversion apparatus The current sensor 74 may be provided on the reference voltage line L32. The current sensor 74 may have a first end coupled to the anode of the diode D3 and to the second end of the capacitor C3, and a second end coupled to the smoothing circuit 75. The smoothing circuit 75 may include an inductor L2 and a capacitor C4. The inductor L2 may be provided on the voltage line L31. The inductor L2 may have a first end coupled to the cathode of the diode D3 and to the source of the transistor SW3, and a second end coupled to the capacitor C4. The capacitor C4 may have a first end coupled to the second end of the inductor L2 on the voltage line L31, and a second end coupled to the second end of the current sensor 74 on the reference voltage line L32. The voltage sensor 76 may be configured to detect the output voltage Vout of the power conversion apparatus 60. The voltage sensor 76 may have a first end coupled to the second end of the inductor L2 on the voltage line L31, and a second end coupled to the second end of the current sensor 74 on the reference voltage line L32.

As illustrated in FIG. 9, the four power conversion apparatuses 50A to 50D may be supplied with direct-current electric power from the direct-current power supply PDC. Accordingly, operating voltages of the primary-side circuitry of the power conversion apparatuses 50A to 50D may be equal to each other.

In FIG. 10, the non-isolated power conversion circuit 61, the correction circuits 12A and 12B, the MCU 20, and the drive circuit 68 may configure the secondary-side circuitry. The correction circuits 14A and 14B, the resistors 15A and 15B, the amplifiers 16A and 16B, and the MCU 30 may configure tertiary-side circuitry.

As in the foregoing power conversion system 1 (see FIG. 2), the power conversion apparatuses 60A and 60B and the power conversion apparatuses 60C and 60D may be coupled in series. Accordingly, operating voltages, based on the voltage at the power terminal T22, of the secondary-side circuitry of the power conversion apparatuses 60A and 60B may be higher than operating voltages, based on the voltage at the power terminal T22, of the secondary-side circuitry of the power conversion apparatuses 60C and 60D.

As illustrated in FIG. 9, the respective reference terminals GNDb of the four power conversion apparatuses 60 may be coupled to each other. Accordingly, reference voltages of the tertiary-side circuitry of the four power conversion apparatuses 60 may be the same, and therefore operating voltages of the tertiary-side circuitry of the four power conversion apparatuses 60 may be equal to each other.

The drive circuit 68 illustrated in FIG. 10 may be configured to generate the gate signal SG, based on the gate signal SG1, and to drive the transistor SW3 (see FIG. 11) of the non-isolated power conversion circuit 61, based on the gate signal SG. The MCU 20 generating the gate signal SG1 and the transistor SW3 to be supplied with the gate signal SG may both be elements of the secondary-side circuitry. Accordingly, the drive circuit 68 may drive the transistor SW3, based on the gate signal SG1, without electrically isolating the MCU 20 and the transistor SW3 from each other.

With such a configuration, in the power conversion apparatus 60, as in the power conversion apparatus 10 according to the foregoing example embodiment, negative feedback control may be performed to cause the output voltage Vout detected by the voltage sensor 76 to be equal to a voltage indicated by the voltage command value CMV2, and negative feedback control may be performed to cause the output current Iout detected by the current sensor 74 to be equal to a current indicated by the current command value CMI2.

Further, as with the power conversion system 1 according to the foregoing example embodiment, the power conversion system 2 helps to maintain balance between the respective output currents Tout of the power conversion apparatuses 60A to 60D, and to maintain balance between the respective output voltages Vout of the power conversion apparatuses 60A to 60D.

Modification Example 2

In the foregoing example embodiment, the estimated value of the current transfer ratio of the photocoupler 13A may be used as the parameter PARA; however, this is non-limiting. In some embodiments, any of various parameters corresponding to the estimated value of the current transfer ratio of the photocoupler 13A may be used as the parameter PARA. For example, when the CTR correction circuit 122A generates the correction value CCI, based on a correction function to which the detection value CI is to be inputted to output the correction value CCI, a parameter indicating the correction function may be used as the parameter PARA. Further, for example, when the CTR correction circuit 122A generates the correction value CCI, based on a lookup table to which the detection value CI is to be inputted to output the correction value CCI, a parameter indicating the lookup table may be used as the parameter PARA. Similarly, although the estimated value of the current transfer ratio of the photocoupler 13B may be used as the parameter PARB, this is non-limiting. In some embodiments, any of various parameters corresponding to the estimated value of the current transfer ratio of the photocoupler 13B may be used as the parameter PARB.

Modification Example 3

Figure 12:
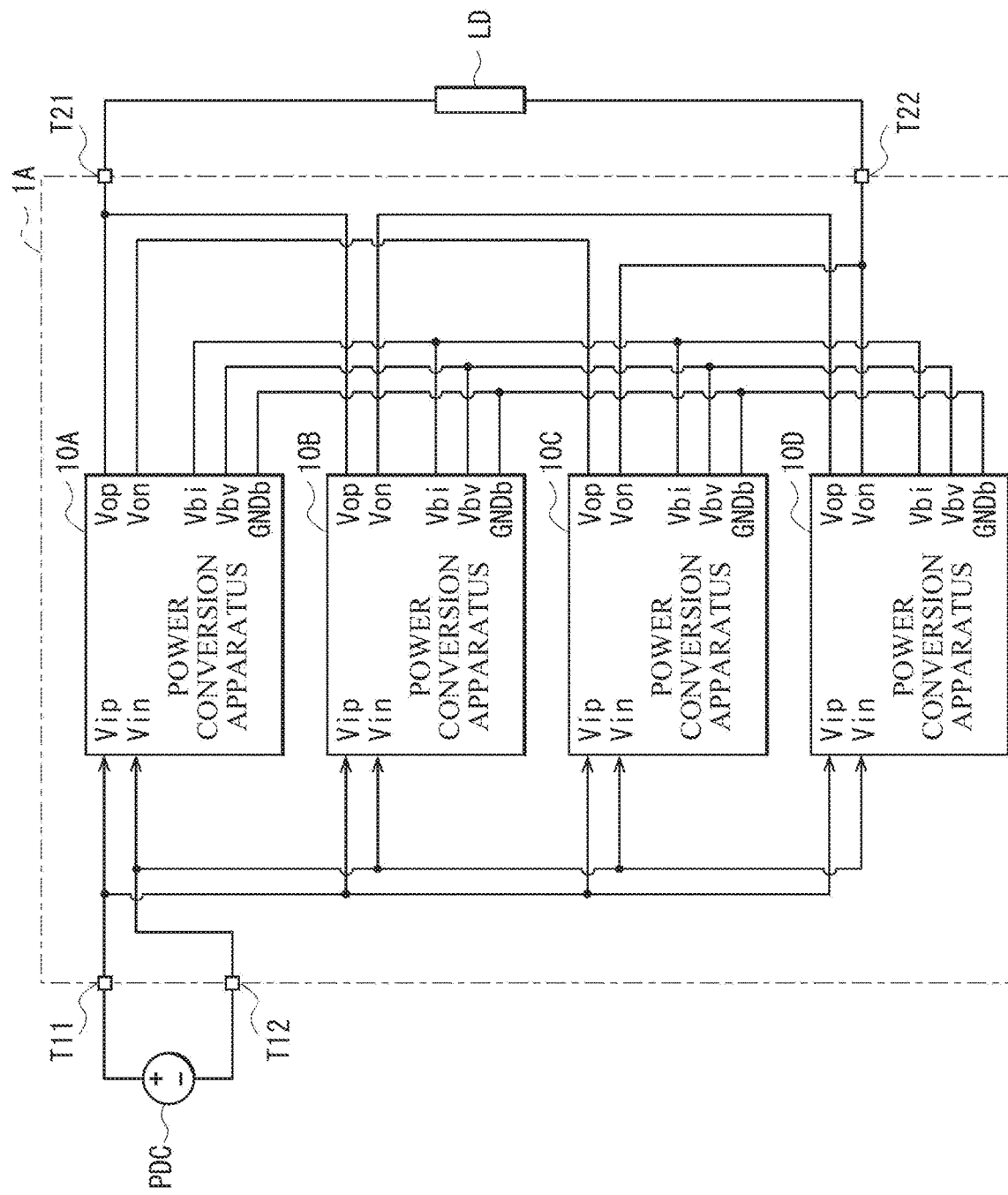
FIG. 12 is a block diagram illustrating a configuration example of a power conversion system according to another modification example.
Figure 13:
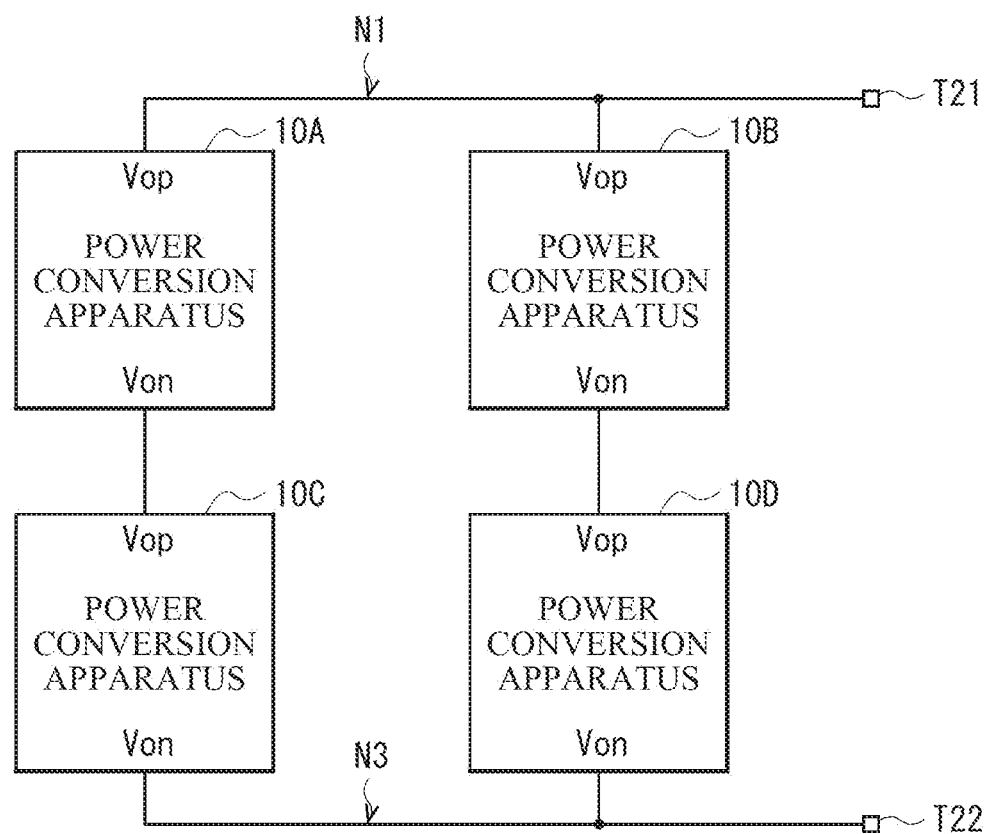
FIG. 13 is an explanatory diagram illustrating a coupling example of power conversion apparatuses illustrated in FIG. 12.

In the foregoing example embodiment, as illustrated in FIGS. 1 and 2, the power conversion apparatuses 10A and 10B may be coupled in parallel, the power conversion apparatuses 10C and 10D may be coupled in parallel, and the power conversion apparatuses 10A and 10B and the power conversion apparatuses 10C and 10D may be coupled in series in the power conversion system 1; however, this is non-limiting. In some embodiments, as in a power conversion system 1A illustrated in FIGS. 12 and 13, the power conversion apparatuses 10A and may be coupled in series, the power conversion apparatuses 10B and 10D may be coupled in series, and the power conversion apparatuses 10A and 10C and the power conversion apparatuses 10B and 10D may be coupled in parallel. Note that the present modification example is applied to the power conversion system 1 illustrated in FIGS. 1 and 2. In some embodiments, the present modification example may be applied to the power conversion system 2 illustrated in FIG. 9.

Other Modification Examples

Any two or more of the foregoing modification examples may be employed in combination. Further, the disclosure encompasses any possible combination of some or all of the various embodiments described herein and incorporated herein.

The disclosure has been described hereinabove with reference to the example embodiment and the modification examples. However, the disclosure is not limited thereto, and various modifications may be made.

For example, in the foregoing example embodiment and modification examples, the disclosure may be applied to the power conversion apparatus including the power conversion circuit having the circuit configuration illustrated in, for example, FIG. 4 or 11; however, this is non-limiting. In some embodiments, the disclosure may be applied to any of power conversion apparatuses having various circuit configurations to which the disclosure is applicable.

For example, in the foregoing example embodiment, the signal generation circuits 100A and 100B may both be provided; however, this is non-limiting. In some embodiments, either the signal generation circuit 100A or the signal generation circuit 100B may only be provided.

For example, in the foregoing example embodiment and modification examples, as illustrated in FIGS. 1 and 2, the four power conversion apparatuses 10 may be provided; however, this is non-limiting. In some embodiments, one or more power conversion apparatuses 10 may be provided. In some embodiments where two or more power conversion apparatuses 10 are provided, the power conversion apparatuses 10 may be coupled in series or in parallel to each other. Further, as illustrated in FIG. 2, pieces of equipment each including two or more parallel-coupled power conversion apparatuses 10 may be coupled in series to each other. Similarly, in the foregoing example embodiment, although the four power conversion apparatuses 60 may be provided as illustrated in FIG. 9, this is non-limiting. In some embodiments, one or more power conversion apparatuses 60 may be provided.

It is possible to achieve at least the following configurations from the foregoing example embodiment and modification examples of the disclosure.

(1)

A power conversion apparatus including:
an input power terminal;
an output power terminal;
a power conversion circuit configured to convert electric power supplied via the input power terminal and to output converted electric power via the output power terminal, the power conversion circuit including a sensor configured to generate a first detection signal corresponding to an output voltage or an output current;
a signal generation circuit configured to generate a second detection signal corresponding to the first detection signal; and
a control circuit configured to control operation of the power conversion circuit, in which
the signal generation circuit includes
a corrector configured to perform correction processing on the first detection signal,
a photocoupler including a light emitting device and a light receiving device, the light emitting device being configured to emit light at a luminance corresponding to the first detection signal having undergone the correction processing, the light receiving device being configured to receive the light emitted by the light emitting device and to generate a light reception signal corresponding to an amount of the light received from the light emitting device, and
an output circuit configured to output the second detection signal corresponding to the light reception signal, and
the corrector is configured to perform the correction processing corresponding to a current transfer ratio of the photocoupler.

(2)

The power conversion apparatus according to (1), in which
the signal generation circuit includes
a first analog-to-digital conversion circuit configured to generate a first digital value by performing analog-to-digital conversion on the first detection signal,
a digital isolator,
a second analog-to-digital conversion circuit configured to generate a second digital value by performing analog-to-digital conversion on the second detection signal, and
a processing circuit configured to estimate the current transfer ratio, based on the first digital value supplied via the digital isolator and the second digital value, and to generate a parameter corresponding to the current transfer ratio estimated, and
the corrector is configured to perform, based on the parameter, the correction processing corresponding to the current transfer ratio.

(3)

The power conversion apparatus according to (2), in which the processing circuit is configured to correct the second detection signal, based on the first digital value supplied via the digital isolator and the second digital value.

(4)

The power conversion apparatus according to any one of (1) to (3), further including a signal terminal led to a terminal, the terminal allowing for output of the second detection signal of the signal generation circuit, in which
the control circuit is configured to control the operation of the power conversion circuit, based on a voltage at the signal terminal and a voltage of the second detection signal.

(5)

A power conversion system including
a plurality of power conversion apparatuses, each of the power conversion apparatuses including:
an input power terminal;
an output power terminal;
a power conversion circuit configured to convert electric power supplied via the input power terminal and to output converted electric power via the output power terminal, the power conversion circuit including a sensor configured to generate a first detection signal corresponding to an output voltage or an output current;
a signal generation circuit configured to generate a second detection signal corresponding to the first detection signal;
a signal terminal led to a terminal, the terminal allowing for output of the second detection signal of the signal generation circuit; and
a control circuit configured to control operation of the power conversion circuit, based on a voltage at the signal terminal and a voltage of the second detection signal, in which
the respective signal terminals of the power conversion apparatuses are coupled to each other,
the signal generation circuit includes a corrector configured to perform correction processing on the first detection signal, a photocoupler including a light emitting device and a light receiving device, the light emitting device being configured to emit light at a luminance corresponding to the first detection signal having undergone the correction processing, the light receiving device being configured to receive the light emitted by the light emitting device and to generate a light reception signal corresponding to an amount of the light received from the light emitting device, and an output circuit configured to output the second detection signal corresponding to the light reception signal, and the corrector is configured to perform the correction processing corresponding to a current transfer ratio of the photocoupler.

(6)

The power conversion system according to (5), in which the output power terminal of each of the power conversion apparatuses includes a power terminal and a reference power terminal, and the power conversion apparatuses include a first power conversion apparatus having the power terminal coupled to a first power node and the reference power terminal coupled to a second power node, and a second power conversion apparatus having the power terminal coupled to the first power node and the reference power terminal coupled to the second power node.

(7)

The power conversion system according to (5) or (6), in which the output power terminal of each of the power conversion apparatuses includes a power terminal and a reference power terminal, and the power conversion apparatuses include a first power conversion apparatus having the power terminal coupled to a first power node and the reference power terminal coupled to a second power node, and a third power conversion apparatus having the power terminal coupled to the second power node and the reference power terminal coupled to a third power node.

The power conversion apparatus and the power conversion system according to at least one embodiment of the disclosure each make it possible to increase detection accuracy.

Although the technology has been described hereinabove in terms of the example embodiment and modification examples, the technology is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. The use of the terms first, second, etc. do not denote any order or importance, but rather the terms first, second, etc. are used to distinguish one element from another. The term "substantially" and its variants are defined as being largely but not necessarily wholly what is specified as understood by one of ordinary skill in the art. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. A power conversion apparatus comprising:
an input power terminal;
an output power terminal;
a power conversion circuit configured to convert electric power supplied via the input power terminal and to output converted electric power via the output power terminal, the power conversion circuit including a sensor configured to generate a first detection signal corresponding to an output voltage or an output current;
a signal generation circuit configured to generate a second detection signal corresponding to the first detection signal; and
a control circuit configured to control operation of the power conversion circuit,
wherein
the signal generation circuit includes
a corrector configured to perform correction processing on the first detection signal,
a photocoupler including a light emitting device and a light receiving device, the light emitting device being configured to emit light at a luminance corresponding to the first detection signal having undergone the correction processing, the light receiving device being configured to receive the light emitted by the light emitting device and to generate a light reception signal corresponding to an amount of the light received from the light emitting device, and
an output circuit configured to output the second detection signal corresponding to the light reception signal,
the corrector is configured to perform the correction processing corresponding to a current transfer ratio of the photocoupler,
the signal generation circuit includes
a first analog-to-digital conversion circuit configured to generate a first digital value by performing analog-to-digital conversion on the first detection signal,
a digital isolator,
a second analog-to-digital conversion circuit configured to generate a second digital value by performing analog-to-digital conversion on the second detection signal, and
a processing circuit configured to estimate the current transfer ratio, based on the first digital value supplied via the digital isolator and the second digital value, and to generate a parameter corresponding to the current transfer ratio estimated, and
the corrector is configured to perform, based on the parameter, the correction processing corresponding to the current transfer ratio.

2. The power conversion apparatus according to claim 1, wherein the processing circuit is configured to correct the second detection signal, based on the first digital value supplied via the digital isolator and the second digital value.

3. The power conversion apparatus according to claim 1, further comprising a signal terminal led to a terminal, the terminal allowing for output of the second detection signal of the signal generation circuit, wherein the control circuit is configured to control the operation of the power conversion circuit, based on a voltage at the signal terminal and a voltage of the second detection signal.

4. The power conversion apparatus according to claim 2, further comprising a signal terminal led to a terminal, the terminal allowing for output of the second detection signal of the signal generation circuit, wherein the control circuit is configured to control the operation of the power conversion circuit, based on a voltage at the signal terminal and a voltage of the second detection signal.

5. A power conversion system comprising a plurality of power conversion apparatuses, each of the power conversion apparatuses including:

an input power terminal;

an output power terminal;

a power conversion circuit configured to convert electric power supplied via the input power terminal and to output converted electric power via the output power terminal, the power conversion circuit including a sensor configured to generate a first detection signal corresponding to an output voltage or an output current;

a signal generation circuit configured to generate a second detection signal corresponding to the first detection signal;

a signal terminal led to a terminal, the terminal allowing for output of the second detection signal of the signal generation circuit; and a control circuit configured to control operation of the power conversion circuit, based on a voltage at the signal terminal and a voltage of the second detection signal, wherein the respective signal terminals of the power conversion apparatuses are coupled to each other, the signal generation circuit includes a corrector configured to perform correction processing on the first detection signal, a photocoupler including a light emitting device and a light receiving device, the light emitting device being configured to emit light at a luminance corresponding to the first detection signal having undergone the correction processing, the light receiving device being configured to receive the light emitted by the light emitting device and to generate a light reception signal corresponding to an amount of the light received from the light emitting device, and an output circuit configured to output the second detection signal corresponding to the light reception signal, the corrector is configured to perform the correction processing corresponding to a current transfer ratio of the photocoupler, the signal generation circuit includes a first analog-to-digital conversion circuit configured to generate a first digital value by performing analog-to-digital conversion on the first detection signal, a digital isolator, a second analog-to-digital conversion circuit configured to generate a second digital value by performing analog-to-digital conversion on the second detection signal, and a processing circuit configured to estimate the current transfer ratio, based on the first digital value supplied via the digital isolator and the second digital value, and to generate a parameter corresponding to the current transfer ratio estimated, and the corrector is configured to perform, based on the parameter, the correction processing corresponding to the current transfer ratio.

6. The power conversion system according to claim 5, wherein the output power terminal of each of the power conversion apparatuses includes a power terminal and a reference power terminal, and the power conversion apparatuses include a first power conversion apparatus having the power terminal coupled to a first power node and the reference power terminal coupled to a second power node, and a second power conversion apparatus having the power terminal coupled to the first power node and the reference power terminal coupled to the second power node.

7. The power conversion system according to claim 5, wherein the output power terminal of each of the power conversion apparatuses includes a power terminal and a reference power terminal, and the power conversion apparatuses include a first power conversion apparatus having the power terminal coupled to a first power node and the reference power terminal coupled to a second power node, and a third power conversion apparatus having the power terminal coupled to the second power node and the reference power terminal coupled to a third power node.

8. The power conversion system according to claim 6, wherein the power conversion apparatuses further include a third power conversion apparatus having the power terminal coupled to the second power node and the reference power terminal coupled to a third power node.

* * * * *